US007809669B2

(12) United States Patent
Huelsman et al.

(10) Patent No.: US 7,809,669 B2
(45) Date of Patent: *Oct. 5, 2010

(54) RULE PROCESSING SYSTEM FOR DETERMINING A RESULT RESPONSE

(76) Inventors: David L. Huelsman, 211 Cantwell Ct., Reynoldsburg, OH (US) 43068; Sharon E. Love, 7265 Havens Rd., Blacklick, OH (US) 43004; Douglas M. Mair, 554 Timberlake Dr., Westerville, OH (US) 43081

( * ) Notice: Subject to any disclaimer, the term of this patent is extended or adjusted under 35 U.S.C. 154(b) by 31 days.

This patent is subject to a terminal disclaimer.

(21) Appl. No.: 12/170,369

(22) Filed: Jul. 9, 2008

(65) Prior Publication Data

US 2008/0270337 A1    Oct. 30, 2008

Related U.S. Application Data

(63) Continuation of application No. 11/710,972, filed on Feb. 27, 2007, now Pat. No. 7,430,548, which is a continuation of application No. 10/101,154, filed on Mar. 20, 2002, now Pat. No. 7,188,091.

(60) Provisional application No. 60/278,655, filed on Mar. 21, 2001.

(51) Int. Cl.
*G06F 17/00* (2006.01)
*G06N 5/02* (2006.01)
(52) U.S. Cl. .......................... 706/47; 707/101
(58) Field of Classification Search .............. 706/12, 706/14, 47; 707/101
See application file for complete search history.

(56) References Cited

U.S. PATENT DOCUMENTS 5,212,771 A   5/1993   Gane et al.

(Continued)

FOREIGN PATENT DOCUMENTS

WO          9948031          9/1999

(Continued)

OTHER PUBLICATIONS

F. Somenzi: CUDD:CU Decision Diagram Package; http://vlsi.colorado.edu/~fabio/CUDD/nodel.html, site visited Jun. 11, 2009.

(Continued)

*Primary Examiner*—Donald Sparks
*Assistant Examiner*—Ola Olude Afolabi
(74) *Attorney, Agent, or Firm*—Stolowitz Ford Cowger LLP

(57) ABSTRACT

A rule processing apparatus includes modules for defining/entering attributes, enumerations, and/or relationships; packaging the definitions in a reduced canonical form suitable for propositional logic manipulation using zero-suppressed binary decision diagrams (Zdd) to produce a prime Zdd; and/or (iii) executing the rule by applying a series of user inputs to the prime Zdd to determine a result that preferably includes conflict and selection advice to guide the user to satisfaction. Elective events, such as but not limited to the display of messages or the performance of calculations, may optionally be packaged along with the prime rule or components thereof, and presented during execution to help guide the end user to satisfaction or compliancy when choosing among possible selections. The apparatus automates determination of a complex rule having a combinatorial exploded number of rule components, or a combinatorial number of possible outcomes, exceeding computational capacity of present day computing systems.

15 Claims, 25 Drawing Sheets

U.S. PATENT DOCUMENTS

| | | | |
|---|---|---|---|
| 5,301,284 A | 4/1994 | Estes et al. | |
| 5,311,424 A | 5/1994 | Mukherjee et al. | |
| 5,367,619 A | 11/1994 | Dipaolo | |
| 5,576,965 A | 11/1996 | Akasaka et al. | |
| 5,630,025 A | 5/1997 | Dolby et al. | |
| 5,701,400 A | 12/1997 | Amado | |
| 5,745,765 A | 4/1998 | Paseman | |
| 5,805,462 A | 9/1998 | Poirot et al. | |
| 5,809,212 A | 9/1998 | Shasha | |
| 5,844,554 A | 12/1998 | Geller et al. | |
| 5,877,966 A | 3/1999 | Morris et al. | |
| 5,889,993 A * | 3/1999 | Kroeger et al. | 717/128 |
| 5,910,898 A | 6/1999 | Johannsen | |
| 5,924,077 A | 7/1999 | Beach et al. | |
| 5,963,953 A | 10/1999 | Cram et al. | |
| 5,987,473 A | 11/1999 | Jorgensen | |
| 6,002,854 A | 12/1999 | Lynch et al. | |
| 6,016,394 A | 1/2000 | Walker | |
| 6,031,984 A | 2/2000 | Walser | |
| 6,035,305 A | 3/2000 | Strevey et al. | |
| 6,064,982 A | 5/2000 | Puri | |
| 6,076,080 A | 6/2000 | Morscheck et al. | |
| 6,163,876 A | 12/2000 | Ashar | |
| 6,182,275 B1 | 1/2001 | Beelitz et al. | |
| 6,226,656 B1 | 5/2001 | Zawadzki et al. | |
| 6,256,618 B1 | 7/2001 | Spooner et al. | |
| 6,321,186 B1 | 11/2001 | Yuan et al. | |
| 6,327,581 B1 | 12/2001 | Platt | |
| 6,349,290 B1 | 2/2002 | Horowitz | |
| 6,385,617 B1 | 5/2002 | Malik | |
| 6,389,576 B1 | 5/2002 | Lam et al. | |
| 6,396,488 B1 | 5/2002 | Simmons et al. | |
| 6,424,962 B1 | 7/2002 | Bilon | |
| 6,442,732 B1 | 8/2002 | Abramovici et al. | |
| 6,519,767 B1 | 2/2003 | Carter et al. | |
| 6,529,890 B1 | 3/2003 | Pandit et al. | |
| 6,535,883 B1 | 3/2003 | Lee et al. | |
| 6,556,978 B1 | 4/2003 | Ginsberg et al. | |
| 6,567,814 B1 | 5/2003 | Bankier | |
| 6,598,035 B2 | 7/2003 | Branson et al. | |
| 6,651,096 B1 * | 11/2003 | Gai et al. | 709/223 |
| 6,658,458 B1 | 12/2003 | Gai et al. | |
| 6,741,975 B1 | 5/2004 | Nakisa et al. | |
| 6,795,832 B2 | 9/2004 | McGeorge et al. | |
| 6,874,016 B1 * | 3/2005 | Gai et al. | 709/215 |
| 6,952,812 B2 | 10/2005 | Abadir et al. | |
| 6,961,913 B1 | 11/2005 | Okazaki et al. | |
| 6,983,187 B2 | 1/2006 | Kern | |
| 7,062,478 B1 * | 6/2006 | Huelsman et al. | 706/47 |
| 7,130,783 B1 | 10/2006 | Harer et al. | |
| 7,188,333 B1 | 3/2007 | LaMotta et al. | |
| 7,587,379 B2 * | 9/2009 | Huelsman et al. | 706/47 |
| 2001/0029499 A1 | 10/2001 | Tuatini et al. | |
| 2002/0065701 A1 | 5/2002 | Kim et al. | |
| 2002/0078431 A1 | 6/2002 | Reps | |
| 2002/0095645 A1 | 7/2002 | Rodeh | |
| 2002/0108093 A1 | 8/2002 | Moondanos et al. | |
| 2002/0112213 A1 | 8/2002 | Abadir et al. | |
| 2002/0165701 A1 | 11/2002 | Lichtenberg et al. | |
| 2002/0178432 A1 | 11/2002 | Kim et al. | |
| 2004/0138988 A1 | 7/2004 | Munro et al. | |
| 2004/0181500 A1 | 9/2004 | Huelsman et al. | |
| 2004/0260667 A1 | 12/2004 | Huelsman et al. | |
| 2005/0080648 A1 | 4/2005 | Huelsman et al. | |
| 2005/0108183 A1 | 5/2005 | Huelsman et al. | |
| 2007/0112767 A1 * | 5/2007 | Tilley | 707/6 |
| 2007/0159304 A1 * | 7/2007 | Agarwal et al. | 340/10.32 |
| 2007/0290791 A1 * | 12/2007 | Batra | 340/5.31 |

FOREIGN PATENT DOCUMENTS

| | | |
|---|---|---|
| WO | 0111463 | 2/2001 |
| WO | 03081478 | 10/2003 |

OTHER PUBLICATIONS

USPTO; File History U.S. Appl. No. 10/198,100 to Huelsman et al., filed Jul. 19, 2002; Aug. 2009.

Mishchenko, Alan. "An Introduction to Zero-Suppressed Binary Decision Diagrams" 2001, Jun. 8, Department of Electrical Engineering Portland State;University. pp. 1-15.

"Array". Microsoft Computer Dictionary, Fifth Edition. May 1, 2002.

Aloul, F., M. Mneimneh, and K. Sakallah "ZBDD-Based Backtrack Search SAT Solver" International Workshop on Logic Synthesis (IWLS), New Orleans, Louisiana, pp. 131-136, 2002 http://www.eecs.umich.edu/~faloul/.

Moller, J., HR Andersen, H Hulgaard, "Product Configuration over the Internet presented at",The 6th INFORMS Conference on Information Systems and Technology, Nov. 3-4, 2001, Miami Beach, Florida.

Moller, Jesper, "Configuration and E-commerce", IFORS Jul. 2002.

Minato, Zero-Suppressed BDDs for Set Manipulation in Combinatorial Problems, Proceedings of the 30th Conference on Design Automation, Jul. 1993, pp. 272-277.

Cabodi, et al., Symbolic Traversals of Data Paths with Auxilary Variables, IEEE, 1994, pp. 93-96.

Panda, et al., Symmetry Detection and Dynamic Variable Ordering of Decision Diagrams, Proceedings of the 1994 IEEE/ACM International Conference on Computer-Aided Design, Nov. 1994, pp. 628-631.

Cosnard, et al., Automatic Task Graph Generation Techniques, Proceedings of the Twenty-Eighth Hawaii International Conference on System Sciences, Vo. 2, Jan. 3, 1995, pp. 113-122.

Bryant, Binary Decision Diagrams and Beyond, Enabling Technologies for Formal Verification, IEEE, 1995, pp. 236-243.

Minato, S., Representations of Discrete Funtions, Chapter 1, Graph-Based Representations of Discrete Functions, Sasao and Fujia, ed.s, 1996, Kluwer Academic Publishing, pp. 1-23.

Anderson, An Introduction to Binary Decision Diagrams, University of Denmark, Oct. 1997, pp. 8-11.

Cugola, G, et al., Exploiting an event-based infrastructure to develop complex distributed systems, Proceedings of the 20th International Conference on Software Engineering, Apr. 1998, pp. 261-270.

Gottlob, et al., The complexity of acyclic conjunctive queries, 39th Annual Symposium on Foundations of Computer Science Proceedings, Nov. 8, 1998, pp. 706-715.

Yang, Optimizing Model Checking Based on BDD Characterization,Thesis, Carnegie Mellon U.,May 1999, pp. 9-11.

Ejnioui, et al., Design Partitioning on Single-chip Emulations Systems, Thirteenth International Conference on VLSI Design, Jan. 3, 2000, pp. 234-239.

Kurihara, et al., BDD Encoding for Partial Order Constraints and its Application to Expert Systems in Software Verification Domains, 2000 IEEE International Conference on Systems, Man, Cybernetics, vol. 3, Oct. 8-11, 2000, pp. 2062-2067.

Beck, M., et al., Enabling Full Service Surrogates Using the Portable Channel Representation, Proceedings of the Tenth International Conference on World Wide Web, Apr. 2001, pp. 376-385.

USPTO; PCT/US2003/08265; International Search Report and Preliminary Examination Report; Aug. 13, 2003.

Jacobi et al; Generating Prime and Irredundant Covers for Binary Decision Diagrams; Design Automation, 1992; Proceedings 3rd European Conference; Mar. 1992; pp. 104-108.

European Patent Office; PCT/US2007/079793; International Search Report and Written Opinion; Feb. 7, 2008.

European Patent Office; PCT/US2007/079797; International Search Report and Written Opinion; Feb. 7, 2008.

European Patent Office; PCT/US2007/079797; International Preliminary Report on Patentablility; Mar. 2009.

European Patent Office; PCT/US2007/079793; International Preliminary Report on Patentablility; Mar. 2009.

USPTO; File History U.S. Appl. No. 10/101,151 to Huelsman, et al., filed Mar. 20, 2002; Part I, Mar. 2002 through Feb. 2005.
USPTO; File History U.S. Appl. No. 10/101,151 to Huelsman et al., filed Mar. 20, 2002; Part II, Apr. 2005 through Nov. 2008.
USPTO; File History US Patent Application No. 101,154 to Huelsman et al., filed Mar. 2, 2002.
USPTO; File History U.S. Appl. No. 11/710,972 to Huelsman et al., filed Feb. 27, 2007.
USPTO; File History U.S. Appl. No. 11/941,062 to Huelsman et al. filed Nov. 15, 2007.
USPTO; File History U.S. Appl. No. 10/198,100 to Huelsman et al., filed Jul. 19, 2002.
USPTO; File History U.S. Appl. No. 10/198,098 to Huelsman et al. filed Jul. 19, 2002.
Minato S. "Zero Suppressed BDDs and their Applications"; International Journal on Software Tools for Technology Transfer; vol. 3 No. 2.; pp. 156-170; Year: 2001.
USPTO; File History U.S. Appl. No. 11/527,638 to Huelsman et al., field Sep. 27, 2006; Aug. 2009.
Stolowitz Ford Cowger LLP; Listing of Related Cases; May 24, 2010; 2 Pages.
European Patent Office; Supplemental Search Report, EP 03716683. 2; Jul. 2, 2010; 3 Pages.

* cited by examiner

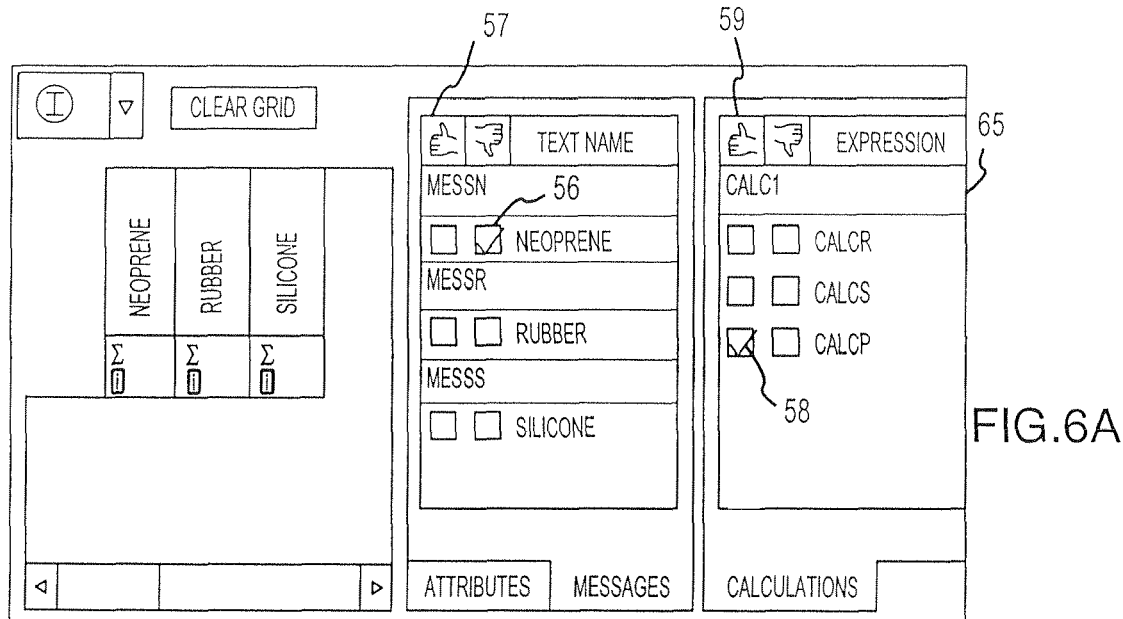
FIG.6A
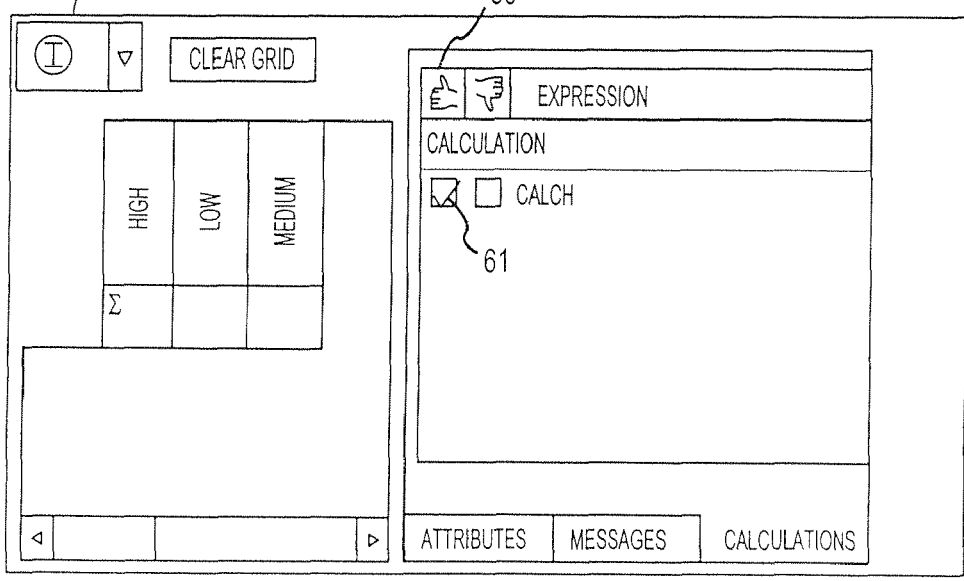
FIG.6C
FIG.6B

| | | 210 INCLUDE RESULT | 212 EXCLUDE RESULT | 214 OVERALL RESULT |
|---|---|:---:|:---:|:---:|
| GROUP 0 MATERIAL | RUBBER | ⟦0⟧ | 0 | ⟦0⟧ |
| | SILICONE | ⟦1⟧ | 1 | ⟦1⟧ |
| | NEOPRENE | 2 | ⟦2⟧ | 2 |
| GROUP 1 PRESSURE | LOW | ⟦3⟧ | 3 | ⟦3⟧ |
| | MEDIUM | ⟦4⟧ | 4 | ⟦4⟧ |
| | HIGH | 5 | ⟦5⟧ | 5 |
| GROUP 2 PH | ACIDIC | ⟦6⟧ | 6 | ⟦6⟧ |
| | BASIC | ⟦7⟧ | 7 | ⟦7⟧ |
| GROUP 3 THICKNESS | 0-25 MM | 8 | 8 | 8 |
| | 25-50 MM | ⟦9⟧ | 9 | ⟦9⟧ |
| | 50-75 MM | ⟦10⟧ | 10 | ⟦10⟧ |

FIG.17

| OVERALL MODEL VALIDITY: INVALID 242 | | USER INPUT | PRIME ADVICE | GROUP VALIDITY | CONFLICT ADVICE | ELECTIVE ADVICE |
|---|---|---|---|---|---|---|
| GROUP 0 MATERIAL | + RUBBER | 0 | ⬚0 | VALID | NO | |
| | + SILICONE | 1 | 1 | | | |
| | - NEOPRENE | 2 | 2 | | | |
| GROUP 1 PRESSURE | + LOW | 3 | ⬚3 | INVALID | YES | |
| | + MEDIUM | 4 | 4 | | | |
| | - HIGH | ⬚5 | 5 | | | |
| GROUP 2 PH | + ACIDIC | 6 | ⬚6 | VALID | NO | |
| | + BASIC | 7 | ⬚7 | | | |
| GROUP 3 THICKNESS | -0-25 MM | ⬚8 | 8 | INVALID | YES | |
| | +25-50 MM | 9 | 9 | | | |
| | +50-75 MM | 10 | ⬚10 | | | |
| GROUP 4 MASSR | MESSR | | | | | ⬚11 |
| GROUP 5 MASSS | MESSS | | | | | ⬚12 |
| GROUP 6 MASSN | MESSN | | | | | 13 |
| GROUP 7 CALCR | CALCR | | | | | 14 |
| GROUP 8 CALCN | CALCN | | | | | 15 |
| GROUP 9 CALCS | CALCS | | | | | 16 |
| GROUP 10 CALCH | CALCH | | | | | 17 |

FIG.19

HEADER INFORMATION

| BYTE POSITION | 0-2 | 3-6 | 6-10 | 11-14 | 15-18 | 19+ | | | |
|---|---|---|---|---|---|---|---|---|---|
| NAME | NAME | ID | HEADER LENGTH | VERSION | LOGIC TYPE | # OF ATTRIBUTES | ATTRIBUTES ID'S (# OF GROUPS) | COMPRESSION | # OF NODES | # OF VARIABLES |
| SIZE | 3 | 4 | 4 | 4 | 4 | 4 | 4 | 4 | 4 |

VARIABLE ORDERING INFORMATION

| NUMBER OF ELEMENTS | NUMBER OF VARIABLES (FROM HEADER INFO) | NUMBER OF ATTRIBUTES IN THE MODEL (FROM HEADER INFO) | | |
|---|---|---|---|---|
| NAME | VARIABLE INDEX | GROUP START | GROUP END | GROUP TYPE |
| SIZE | 4 | 4 | 4 | 4 |

NODE INFORMATION

| NUMBER OF ELEMENTS | NUMBER OF NODES (FROM HEADER INFO) | | |
|---|---|---|---|
| NAME | NODE INDEX | ELSE INDEX | THEN INDEX |
| SIZE | 4 | 4 | 4 |

FIG.20

RULE PROCESSING SYSTEM FOR DETERMINING A RESULT RESPONSE

CROSS-REFERENCE TO RELATED APPLICATION

The present application is a continuation of and claims priority to U.S. patent application Ser. No. 11/710,972, filed Feb. 27, 2007, which is a continuation of U.S. patent application Ser. No. 10/101,154, filed Mar. 20, 2002, now U.S. Pat. No. 7,188,091, which is a non-provisional of U.S. provisional patent application Ser. No. 60/278,655, filed Mar. 21, 2001, all of which we incorporate by reference.

BACKGROUND

This invention relates to rule processing, but more specifically, to an apparatus that captures and/or that executes a set of rules to automatically provide a decision or advice relative to that decision.

Decision automation, or automated rule processing as it is sometimes called, provides a decision, tests a condition of satisfiability, and/or confirms compliance of a set of rules or conditions—whether those rules or conditions involve conduct of a business or operation of a system or process. Decision automation applies to an activity (business or non-business) requiring the application of rules or criteria to obtain a result, and includes decision support, workflow management, process automation, and multidimensional data analysis. Generally, a rule is characterized as a relationship between or among parameters and/or attributes, as well as a relationship between or among rules themselves. A single-dimensional rule usually expresses a single relationship, condition, or requirement. A multi-dimensional rule, however, embraces many single-dimensional rules or rule components and is satisfied, valid, or complied with when all components thereof are simultaneously valid, satisfied, or complied with for a given set of input parameters. Decision automation is useful to implement complex or multidimensional rules having too many interrelated parameters, attributes, or rule components for convenient or ready human implementation.

Mathematically, satisfiability of a rule may be determined using propositional logic by solving the model or function $f(m,n)$ of m multi-valued inputs and n outputs expressed in canonical form. Decision automation can be applied to deterministic problems directed to product configuration or provisioning, process or system control, certain forms of traffic routing, financial management, building or facilities management, needs analysis, manufacturing, order processing, service provisioning, decision support, product verification, product or service compliance, and other areas where decisions may be made using propositional logic. A specific application of decision automation is providing sales guidance or choice narrowing when dealing with complex or interrelated products and services, such as cross-selling or up-selling, having a combinatorial exploded number of features, attributes, properties, and/or interrelationships that is too demanding (e.g., too numerous or complex) for manual or mental assessment. Software installation wizards also use rule processing or decision automation to automatically determine which among many software components to install in a computing system according to user desirability and/or hardware parameters. Such installation rules are determined a priori by a subject matter expert to alleviate this burden on a less-experienced end-user.

Another application of decision automaton lies in an area where expert or knowledge-based systems guide a user to select among interrelated variables or parameters having complex interrelationships. To validate evacuation routes or a selection of safety measures to be taken, for example, decision automation may also be applied to emergency management of a large facility having a combinatorial exploded number of life-threatening situations in response to various sensors (e.g., fire, flooding, environmental hazard, life support monitors, etc.). Artificial intelligence also employs decision automation to draw inferences from basic parameters, relations, or facts, but stores rules as syntactical programming code. Short of decision automation, but simply to determine satisfaction of a set of design requirements, modeling has been proposed to test functionality of definition systems as finite state machines, e.g., formal verification or model checking of computerized hardware, commercial software, and embedded software systems for chipsets, hard drives, modems, cell phones, consumer appliances, and the like. While some degree of success has been met with hardware and embedded software, model checking for formal verification of commercial software presents many challenges due to an intractably large number of finite states.

Historically, decision automation was achieved using a decision tree representative of rules or relations between parameters where the tree provided various routes or branches leading to an output, e.g., satisfiability or compliance, under all possible input scenarios or parameters. To automate determination of an output, a computer processor systematically and methodically sequenced through branches of the tree under a given set of input parameters. As the number of input parameters grew linearly, the branches in the decision tree grew exponentially. The processing time required to sequence through all possible scenarios grew proportionally to the number of branches (exponentially), sometimes to a point exceeding acceptable processing time of the processor. Very often, computation for all input scenarios, regardless of their relevance, had to be computed to the end for all possible input parameters before a determination was ultimately made. For example, the combination of fifty parameters each having 50 values amounts to $50^{50}$ possible scenarios, which number is virtually impossible to process within acceptable time limits even using the fastest available processing speeds. With currently available processor clock speeds, run times of many prior decision automation systems became unacceptably long as the number of rule permutations or input criteria exceed two to three thousand. The problem was solvable, but required an inordinate amount time, which in classical mathematical terms, is known as an NP complete problem.

In addition to encountering NP complete problems, prior decision automation methods and systems used syntactic programming code or algorithm syntax to build a decision tree to obtain a decision. This had several drawbacks. First, it required skilled computer programmers to design and create code to build the decision tree based on a given set of rules about a subject matter of which they may have little knowledge. Consequently, if the subject matter expert did not possess programming skills, both a programmer and a subject matter expert had to jointly build the decision tree in order to automate rule processing. This was often expensive, inconvenient, and time-consuming. Second, modification of a decision tree with many convoluted paths was expensive, time-consuming, and difficult to debug since programming errors that inevitably occurred were not readily apparent or had an unintended impact on other parts of the decision automation system. The latter problem is exacerbated in a dynamic, real-life business environment where rules, relationships, attributes, parameters, etc. vary unpredictably due to changing circumstances and events.

Further, the output of prior decision automation systems is usually limited to providing an indication of compliance, satisfiability, or acceptance under a given set of input parameters that defined a multidimensional rule. No "advice" is provided when the result proves noncompliant. For purposes of design of complex systems, behavioral observation or testing thereof, a need for conflict or selection advice, or for other reasons, it is desirable to provide an indication of which component(s) of a multidimensional rule invoked a conflict and what parameters, if any, could be changed to render all components of the rule simultaneously compliant or satisfied. Prior systems failed to provide such advice for a large-scale system, e.g., a system having more than 2000 or 3000 variables. In order to process such "what if" scenarios, prior systems laboriously attempted to reprocessed all possible input conditions to find a result, which reprocessing often exceeded the capacity of the decision automation system to determine the decision within acceptable time limits. Thus, prior systems proved ineffective in complex multidimensional rule environments.

A system disclosed in WIPO Publication No. WO 99/48031 by Moller, et al. addresses at least some of the aforementioned problems by providing a database that maps possible outcomes of a propositional logic rule in accordance with given input scenarios. This reduced execution times typically required of microprocessors to implement algorithmic rule processing. In addition to its mode of capturing and manipulating rules, one limitation of the Moeller et al. system is a lack of flexibility to determine "what if" scenarios, i.e., selection or conflict advice.

Case tools are also known in the art to provide automatic translation of business rules into programmatic code, but use of case tools still requires code-writing for rule maintenance, which makes it difficult to implement in usual and customary business environments. For example, subject matter experts and data entry personnel could not easily implement them in their business.

In view of the foregoing, it is desirable to provide a system that expresses, captures, and manipulates complex business or other rules for subsequent processing without using programmatic code or algorithmic syntax.

It is further desirable to provide a way for subject matter experts (non-programmers) to utilize and implement automation of complex rules that are too complicated or numerous for practicable human handling.

It is also desirable to provide a rule processing apparatus or system that is easily updated or modified to adapt to rapidly changing business environments or changing circumstances.

It is also desirable to enhance decision automation by providing messages or calculations, as well as a selection of messages and calculations, in association with a rule determination.

By virtue of providing conflict and selection advice along with rule processing, the present invention enables a user to assess various "what if" feedback scenarios that is particularly useful for system design purposes.

The present invention is also useful to provide a result when encountering a combinatorial exploded number of permutations of interrelated rules or outcomes.

The present invention also aims to use propositional logic to express rules as data in a way to provide rule capture, rule manipulation, and extremely fast processing of a complex, multidimensional rule.

SUMMARY OF THE INVENTION

According to an aspect of the present invention, a system that provides rule processing includes (i) a rule entry system to define/enter attributes, enumerations, and/or relationships thereof representative of an overall rule to be automated (herein also called "maintenance"); (ii) a rule packaging system to produce a representation of the rule in a form suitable for propositional logic manipulation, e.g., preferably reducing a representation of the rule to a reduced canonical form suitable for manipulation as a zero-suppressed binary decision diagram (Zdd); and/or (iii) an execution engine that executes the packaged rule by applying a series of user inputs to the representation, e.g., the prime Zdd, to determine a result that may also include conflict and selection advice to guide the user to achieve rule compliancy or satisfaction. Elective events, such as the display of messages or the performance of calculations, may optionally be packaged along with the prime rule or components thereof and presented during execution to help guide the user when choosing among possible selections. The invention enables determination of a complex rule having a combinatorial exploded number of rule components, or a combinatorial number of possible outcomes, exceeding computational capacity of present day computing systems.

Other features and aspects of the invention will become apparent upon review of the following description taken in connection with the accompanying drawings. The invention, though, is pointed out with particularity by the appended claims.

BRIEF DESCRIPTION OF THE DRAWINGS

FIGS. 2A through 2D show a series relational or rule diagrams representing respective components of an exemplary prime rule described in the present disclosure.

FIG. 6 illustrates assignment of elective events to associated records, e.g., rule components, of the canonical polynomial generated according to the procedure shown in FIG. 5.

FIG. 17 illustrates an additional step to combine the results of the "include" and "exclude" advice that is generated for the illustrated example.

FIG. 19 shows how results of a prime Zdd and elective events Zdd are interpreted according to an aspect of the present invention.

FIG. 20 shows one possible format for storing Zdd information in a memory.

DESCRIPTION OF ILLUSTRATIVE EMBODIMENTS

Figure 1A:
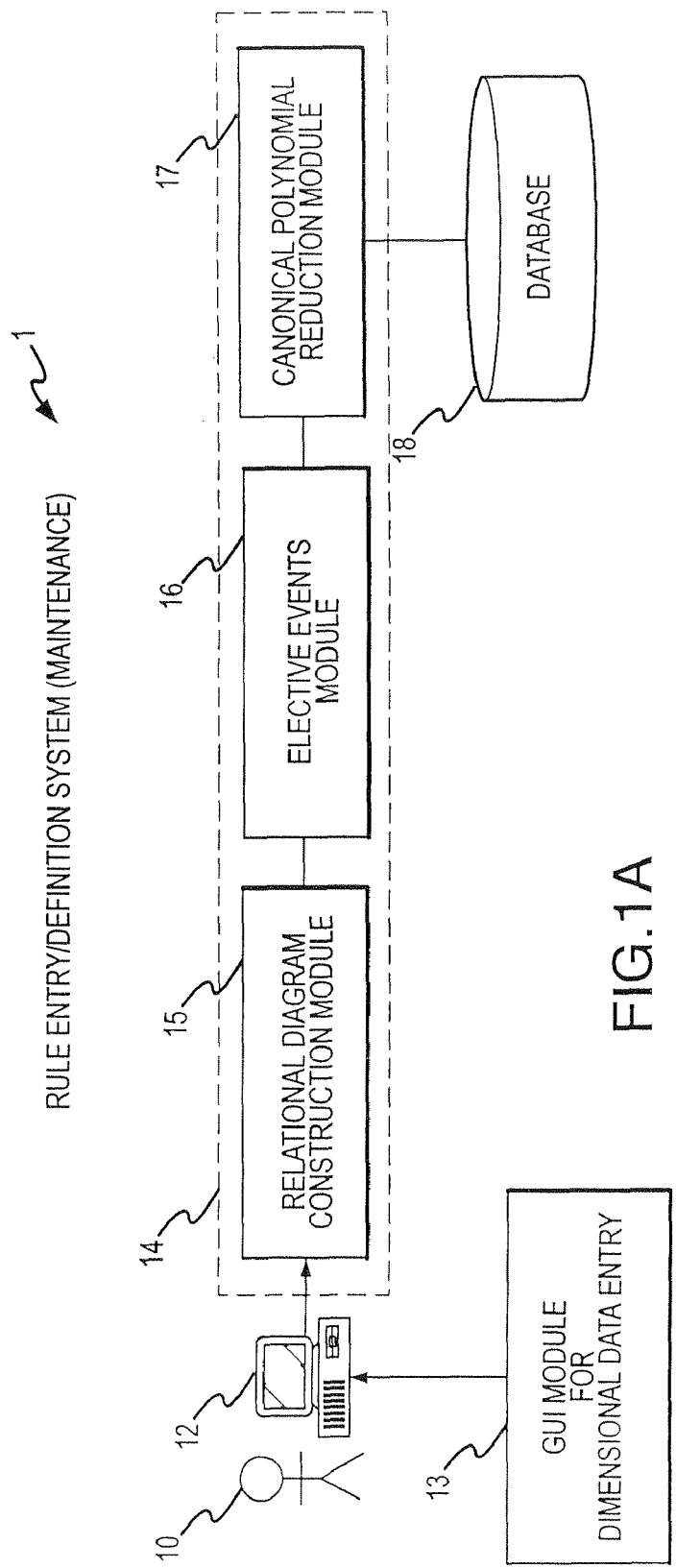
FIG. 1A depicts a preferred rule entry/definition system according to an aspect of the present invention.

FIG. 1A shows a rule entry system 1 that enables a subject matter expert or data entry personnel to capture rules where data entry personnel or an expert user 10 preferably interacts with a GUI module 13 of terminal 12 using a keyboard and mouse to define attributes, enumerations or properties of those attributes, and relationships between and among such attributes, enumerations, and properties. The rule entry system includes a processor that preferably implements a procedure described in connection with FIG. 1E. The processor preferably executes a relational diagram construction module 15 that aids user 10 in generating relational diagrams representing the rule to be processed. Elective events module 16 permits the user 10 to assign certain elective events to be triggered upon occurrence of certain conditions occurring in response to end-user inputs during execution (subsequently described) while canonical polynomial reduction module 17 reduces the entered rules to a compact form suitable for network transmission when used during execution or rule development. The reduced canonical polynomial representing the rule is then stored in a database 18, such as a hard drive, optical medium, or other storage device.

Figure 1B:
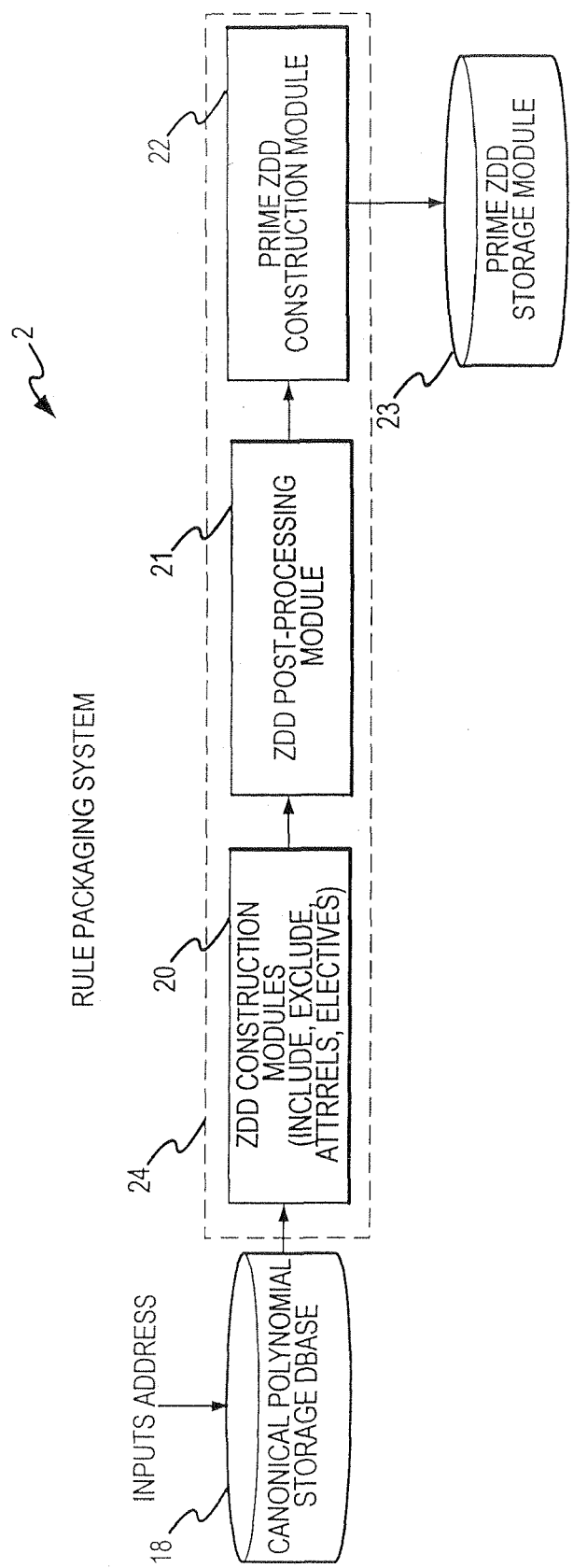
FIG. 1B depicts a preferred rule packaging system according to another aspect of the invention.

FIG. 1B depicts a rule packaging system 2 that accesses database 18 created during rule entry. The packaging system 19 translates rule representations to a preferred form of rule manipulation according to a preferred embodiment of the invention, i.e., zero-suppressed binary decision diagrams ("Zdd"). Other rule representations may be deployed in accordance with the teachings herein to enable automated rule processing, Packaging system 19 uses a processor 24 to implement a Zdd construction module 20 that retrieves database records from database 18 and converts them to a Zdd representing rule components. In particular, Zdd construction module 20 produces an "include" Zdd, an "exclude" Zdd, and an attribute relations (AttrRels) Zdd. Module 20 may also produce Elective Events Zdds in accordance with assignment of messages and/or calculations to certain conditions or outcomes. To simplify certain complex rule representations, Zdd post-processing module 21 reorders nodes of the Zdd to reduce their structure or paths. Prime Zdd construction module 22 combines the series of Zdds created by the modules 20 and 21 to produce a representation of the overall or prime rule to be automated. Once created, the prime Zdd is persisted to memory in database 23.

Figure 1C:
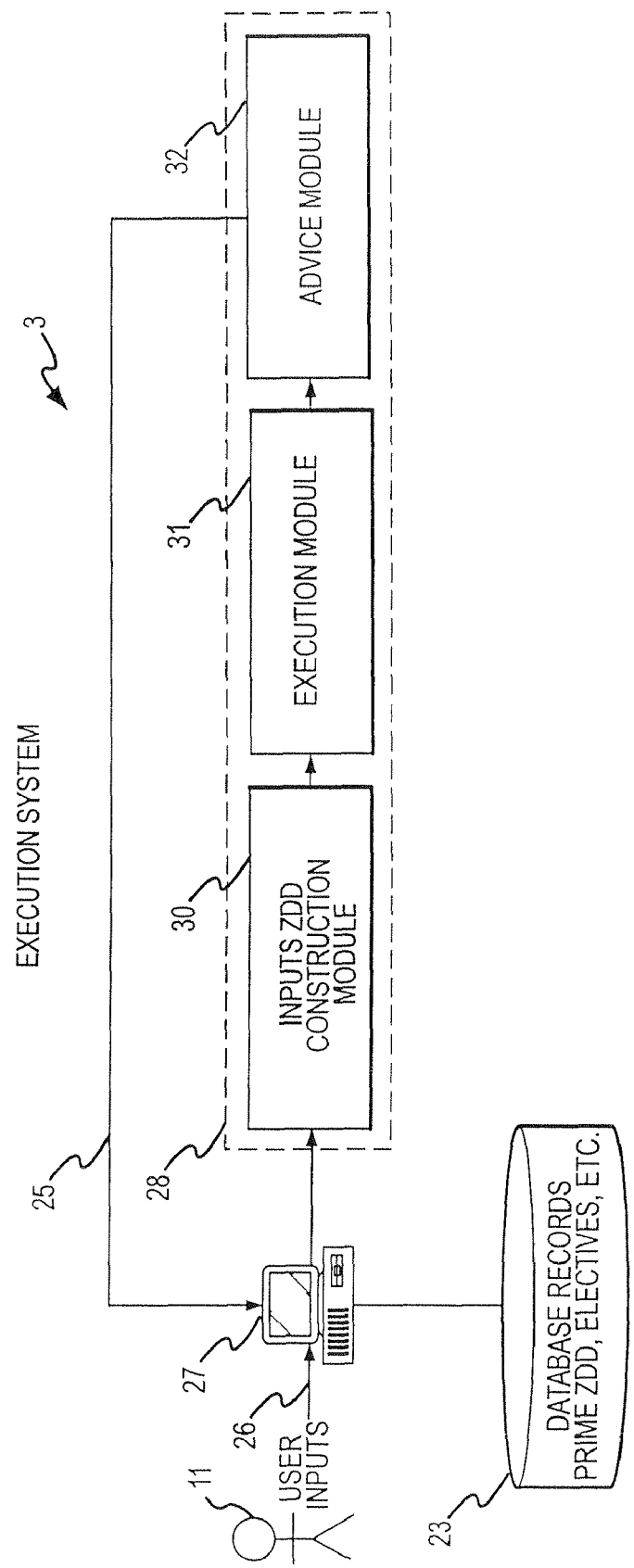
FIG. 1C shows a rule execution system according to one aspect of the present invention that executes a packaged rule produced by the rule packaging system of FIG. 1B.

FIG. 1C shows one form of an execution system 3 that receives via terminal 27 inputs 26 from end user 11. End user input selections 26 comprise a choice of rule parameters supplied by database 23 generated during packaging by the rule packaging system of FIG. 1B. A processor 28 applies the input parameters 26, which may include user-selected attributes, properties, enumerations, etc. against a prime Zdd obtained from database 23 to produce a result i.e., an indication of rule satisfaction and optionally, conflict and selection advice, to help guide end user 11 in choosing input parameters to achieve rule satisfaction. Processor 28 preferably comprises an inputs Zdd construction module 30 that produces Zdds from the user inputs 26 that the execution module 31 uses to "traverse" the prime Zdd. Advice module 32 uses the results of the execution module 31 to generate and communicate conflict and selection advice to end user 11 via a feedback path 25.

Figure 1D:
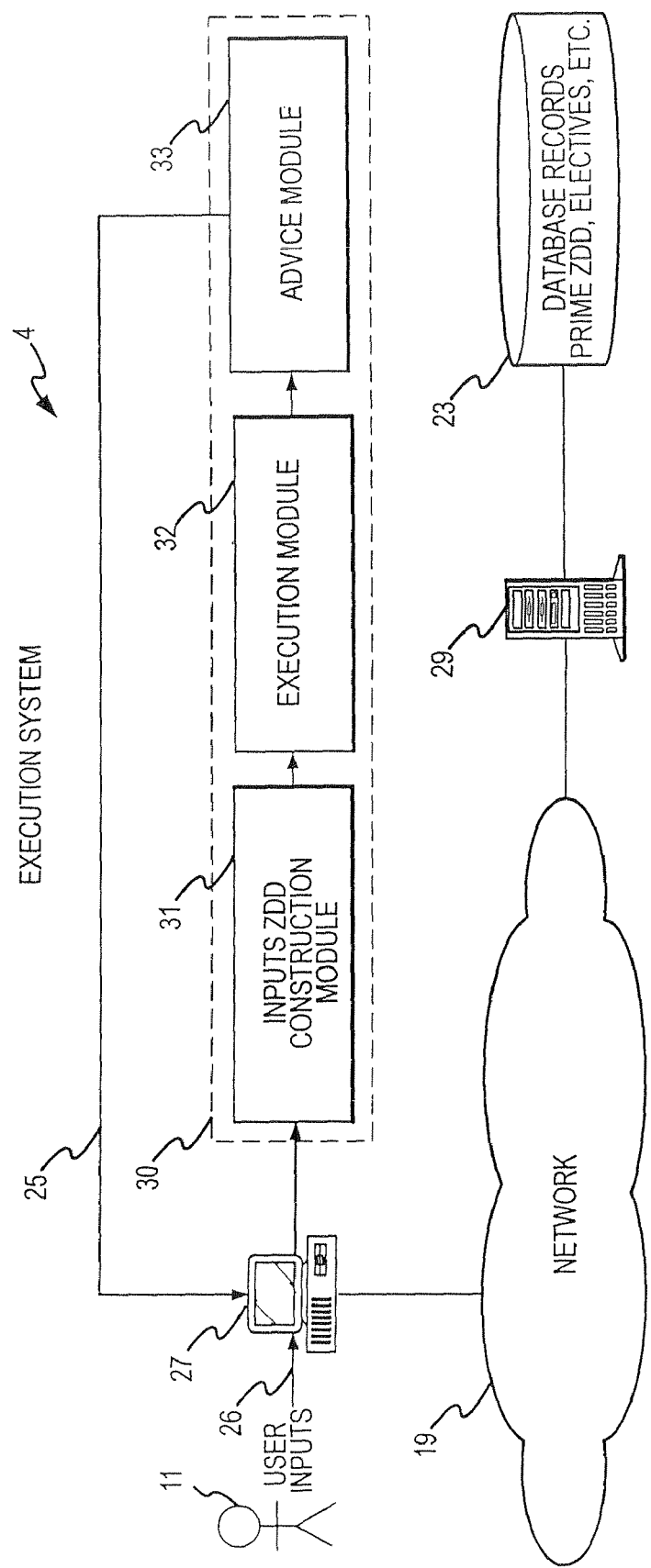
FIG. 1D shows a rule execution system according to another aspect of the present invention that also executes a packaged rule produced by the rule packaging system of FIG. 1B.

FIG. 1D, where like reference numerals represent like elements, shows a similar execution system 4 where the prime Zdd of database 23 under control of network server 29 is downloaded over network 19, e.g., an Internet, via terminal 27.

Figure 1E:
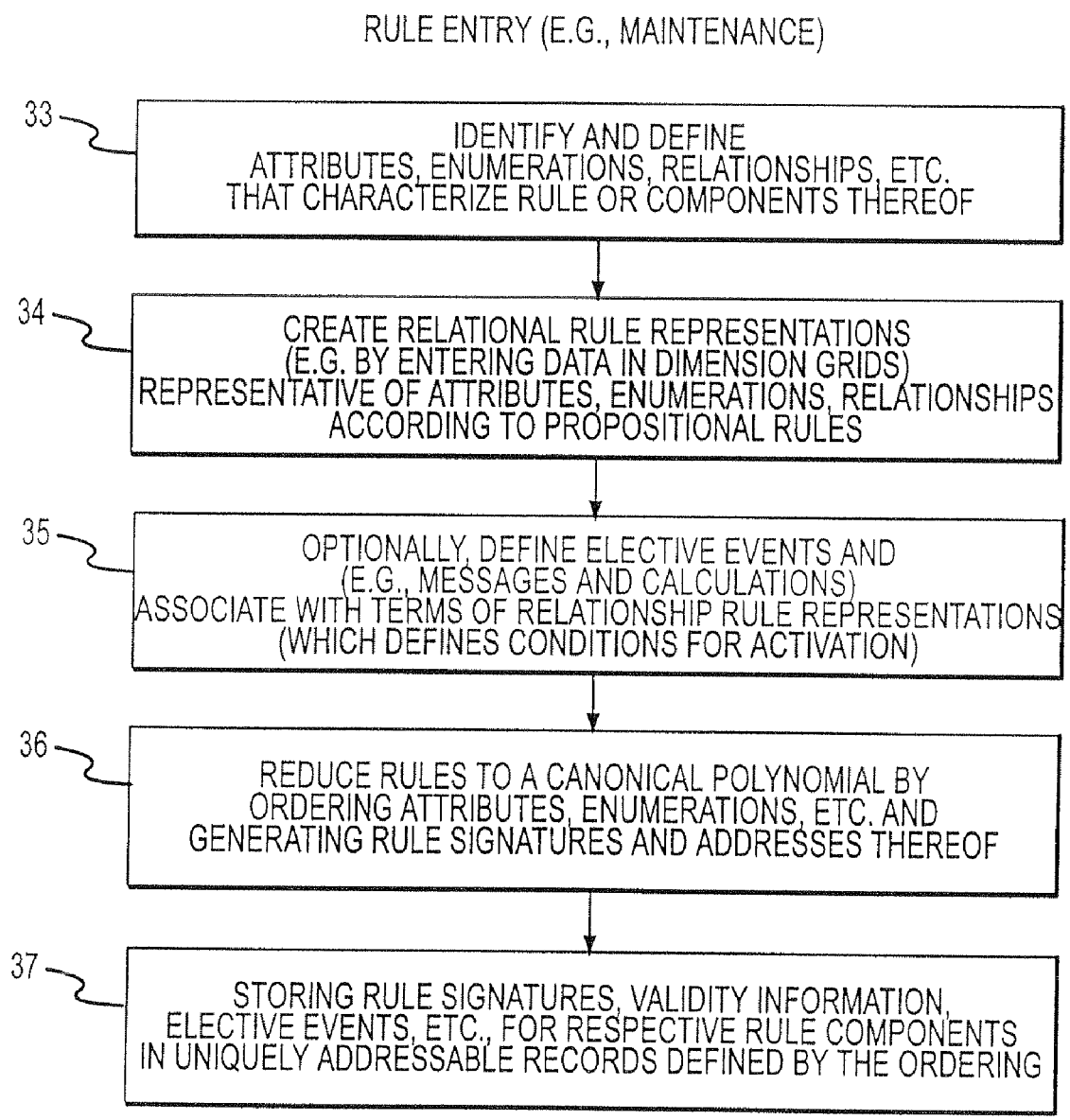
FIG. 1E illustrates a method implemented by the rule entry system of FIG. 1A during rule entry/definition (i.e., maintenance), which is preferably performed by a subject matter expert or data entry personnel.

FIG. 1E shows a rule entry or maintenance procedure implemented by the rule entry system 1 depicted in FIG. 1A. System 1 comprises software routines that enable a subject matter expert to perform procedure 33 of identifying and defining applicable rules expressed in propositional logic. Rules generally include attributes or properties, enumerations or values of such attributes and properties, as well as relationships between and among those attributes and properties. Variables characterizing rules are generally referred to as rule parameters. Further routines included in system 1 implement a procedure 34 to create multiple sets of relational diagrams, e.g., smaller or single-dimensional rules, to express rule components in propositional logic form, e.g., a conjunctive or disjunctive normal form. A complex or prime rule to be automated includes multiple rule components. Smaller rules or rule components are factored from a larger, complex multi-dimensional rules in a sum-of-products (i.e., include rule) form or a product of sum-of-products (i.e., exclude rule)

form. Smaller rules set out in propositional logic are better suited for complex rule construction since they are more easily defined and manipulated. The rule entry system 1 advantageously allows the subject matter expert to interact with the relationships via a multi-dimensional grid or relational diagram, similar to an OLAP display or pivot table, during initial entry or subsequent editing of the rules.

During the rule entry/definition process, a subject matter expert or user typically identifies and defines relationships, attributes, attribute enumerations, etc., characterizing the rule or components thereof, while data entry personnel enters other associated information. Rules are expressed as propositional logic statements. Rule maintenance includes, for each rule or rule component (e.g., polynomial factor), designating logically asserted ("include") or non-asserted ("exclude") relationships between user-defined attributes or enumerations thereof at appropriate locations of a two-dimensional or multidimensional relational grid, table, or matrix representing each rule component. For condensed database storage of rules as data and rapid retrieval, the preferred method also includes ordering, grouping, and indexing components of the overall rule and converting a representation thereof to a reduced canonical polynomial for storage in a memory. Without a need for programmatic coding, currency of the rules can be maintained by repeating the rule entry process when known relationships or parameters thereof change.

In accordance with another aspect of the invention, messages, calculations, or other elective events are associated with various conditions or outcomes of rule processing. The system 1 also performs procedure 35 that associates elective events with various logic conditions so that messages may be communicated to an end-user or calculations may be performed for the end-user to assist in automated rule processing. Rule definitions may further include the identity of relationships between logic outcomes of one or more rule components, on one hand, and the invocation of messages or calculations, on the other hand. Procedure 36 of rule entry system 1 orders components or elements of a model logic function representative of the overall complex rule and translates them to a reduced canonical form. Finally, the system 1 implements procedure 37 that stores a condensed canonical polynomial representation of the overall rule in respective database records of a master table or database.

Attributes of an exemplary rule Model, e.g., a complex multidimensional rule, described for purposes of this disclosure include a complex rule based on material, pressure, pH and thickness, which are set forth in the following Attribute Table.

| Attribute Table Attributes | | | |
| --- | --- | --- | --- |
| Material | Pressure | pH | Thickness |
| Rubber | Low | Acidic | 0-25 mm |
| Silicone | Medium | Basic | 25-50 mm |
| Neoprene | High | | 50-75 mm |

Figure 1F:
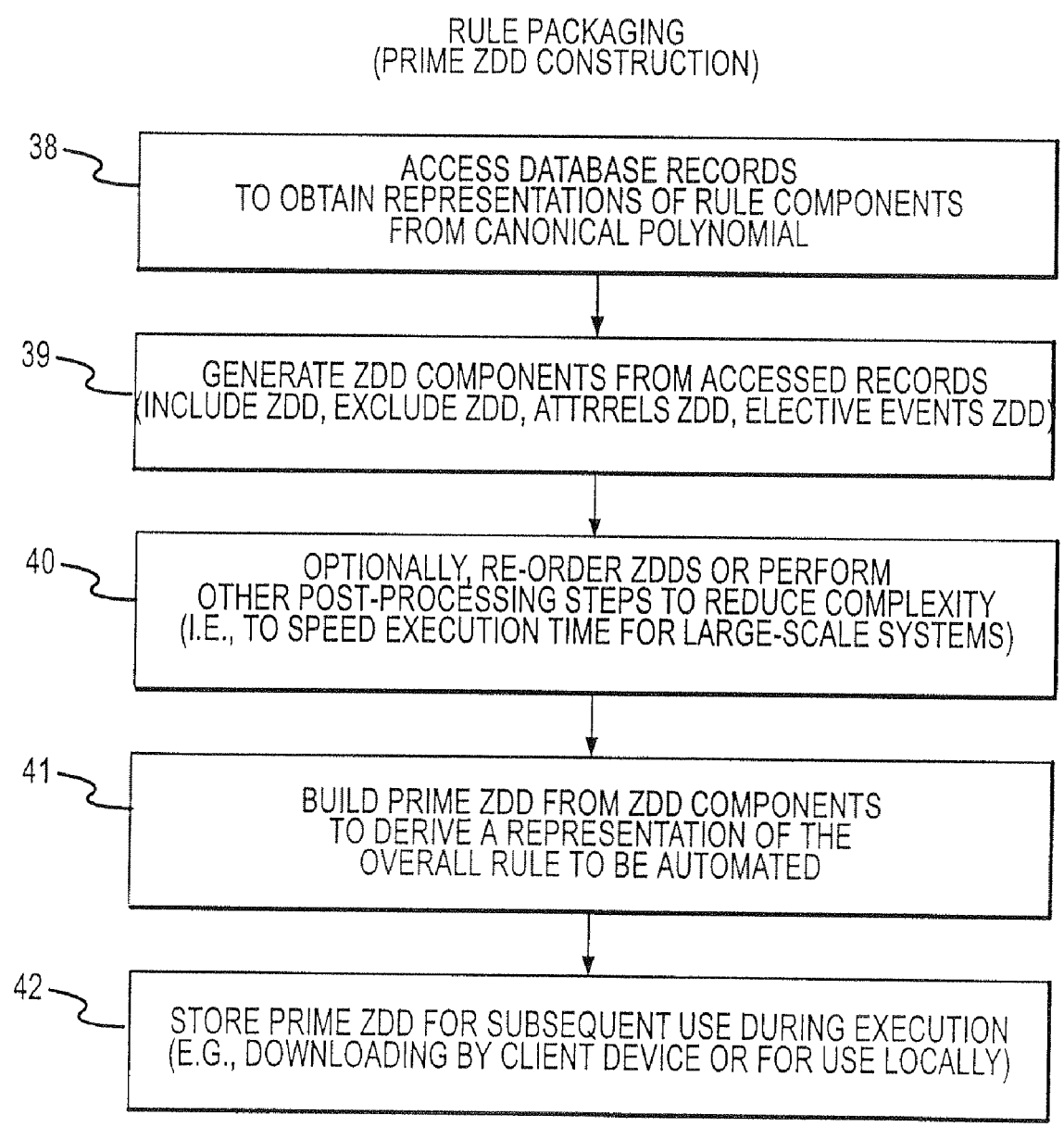
FIG. 1F shows an exemplary method implemented by the rule packaging system of FIG. 1B to produce a canonical polynomial representation of the rule defined according the procedure of FIG. 1A useful for subsequent execution.

This example, though, is not intended to limit the scope of application of the invention. For purposes of illustration, a subject matter expert defined rule components or relationships as follows:

Material and Pressure rule:
Neoprene cannot be used at High Pressure
Material and pH rule:
Only silicone can be used in Basic environments
Pressure and Thickness rule:
Thickness must be greater than 25 mm for High pressure
Material, Pressure, pH and Thickness rule:
Rubber must not be less than 25 mm when used in Acid above Low pressure In addition, the subject matter expert has also defined the following exemplary calculations used by the exemplary rules in the following manner:
Neoprene uses CalcN if valid
Silicone uses CalcS if valid
Rubber uses CalcR if valid
High Pressure uses CalcH if valid Further, the subject matter expert, developed the following exemplary messages that may be communicated to an end user when the following conditions occur:
Neoprene uses MessN if invalid
Silicone uses MessS if invalid
Rubber uses MessR if invalid FIG. 1F illustrates procedures implemented by rule packaging system 2 of FIG. 1B according to an aspect of the invention. Packaging includes accessing memory to obtain rule components; converting the rule components to a special form, e.g., zero-suppressed binary decision diagrams (Zdds), suitable for manipulation; combining representations of the respective rule components to form a representation of an overall rule to be automated; and optionally, reordering the overall rule Zdds to simplify or reduce the size thereof. Reordering improves the capability of handling large-scale, complex rules having multiple dimensions.

Rule packaging system 2 preferably includes software routines to perform procedures 38 and 39 that effect accessing database records of the reduced canonical polynomial representing the rule components and proceeds by constructing zero-suppressed binary decision diagrams (Zdds) for the respective rule components of the database records. Binary decision diagrams are a form of logic propositional expression that has been recently developed in the art. In accordance with the present invention, zero-suppressed binary decision diagrams have been found particularly useful for rule representation and manipulation because they inherently characterize real-life scenarios for business and engineering applications having various "don't care" conditions or scenarios relative to many combinations of attributes, enumerations, properties, or relationships thereof. In prior decision tree analyses, each scenario had to be tested regardless of relevancy, and therefore, these prior systems needlessly wasted computation time or were unable to process a rule to a result within acceptable time limits. According to the present invention, though, use of Zdds for rule processing eliminates needless computation and has tremendously sped automation of very large scale systems having many orders of magnitude of possible outcomes or rule permutations.

Procedure 39, in essence, generates a series of factors of the canonical polynomial that may be separately executed to produce a result for a given rule component or sub-part of the overall prime rule. Those factors, or rule components, are broken down into "include" rules, "exclude" rules, attribute relations, and elective events Zdds are created for each of these components. Other components, as well, may be included in the rule definition.

Optionally, rule packaging system 2 may perform post-processing operations 40 to facilitate subsequent execution of the prime rule. In cases where any of the Zdds are overly large or complex, they may be re-ordered to reduce the number of nodes or paths. This step further increases the ability to handle very large scale, complex rules.

After the Zdd components are generated and/or post-processed, rule packaging system 2 implements a procedure 41 to form a prime Zdd by logically combining an include Zdd, an exclude Zdd, an AttrRels Zdd, and an Elective Events Zdd. The prime Zdd, which is stored in a memory at procedure 42, represents the overall or prime rule to be process. In response to user inputs, the prime Zdd produces a result, as well as messages and calculations. In should be noted that the overall or prime Zdd may be defined to include all or a portion of the component Zdds, depending on the design of the system or method. For example, if an overall or prime rule is defined to have only "include" components, then the prime Zdd need not have "exclude" components. Likewise, if no elective events are designed into the method or system, then the prime or overall Zdd will not have such a Zdd component. However defined, the prime or overall Zdd represents the business or engineering rule to be process. In response to user inputs, the prime Zdd will produce a result, and optionally, messages and calculations.

Execution preferably comprises applying end-user inputs against pre-packaged Zdds representative of the overall rule in order to produce a result, i.e., an indication of satisfiability or compliancy, as well as selection and conflict advice in response to a failure of satisfiability or compliancy. The result, selection advice, or conflict advice may be accompanied by a display of messages or the performance of a calculation, logic or otherwise, and communicated to the end user.

Figure 1G:
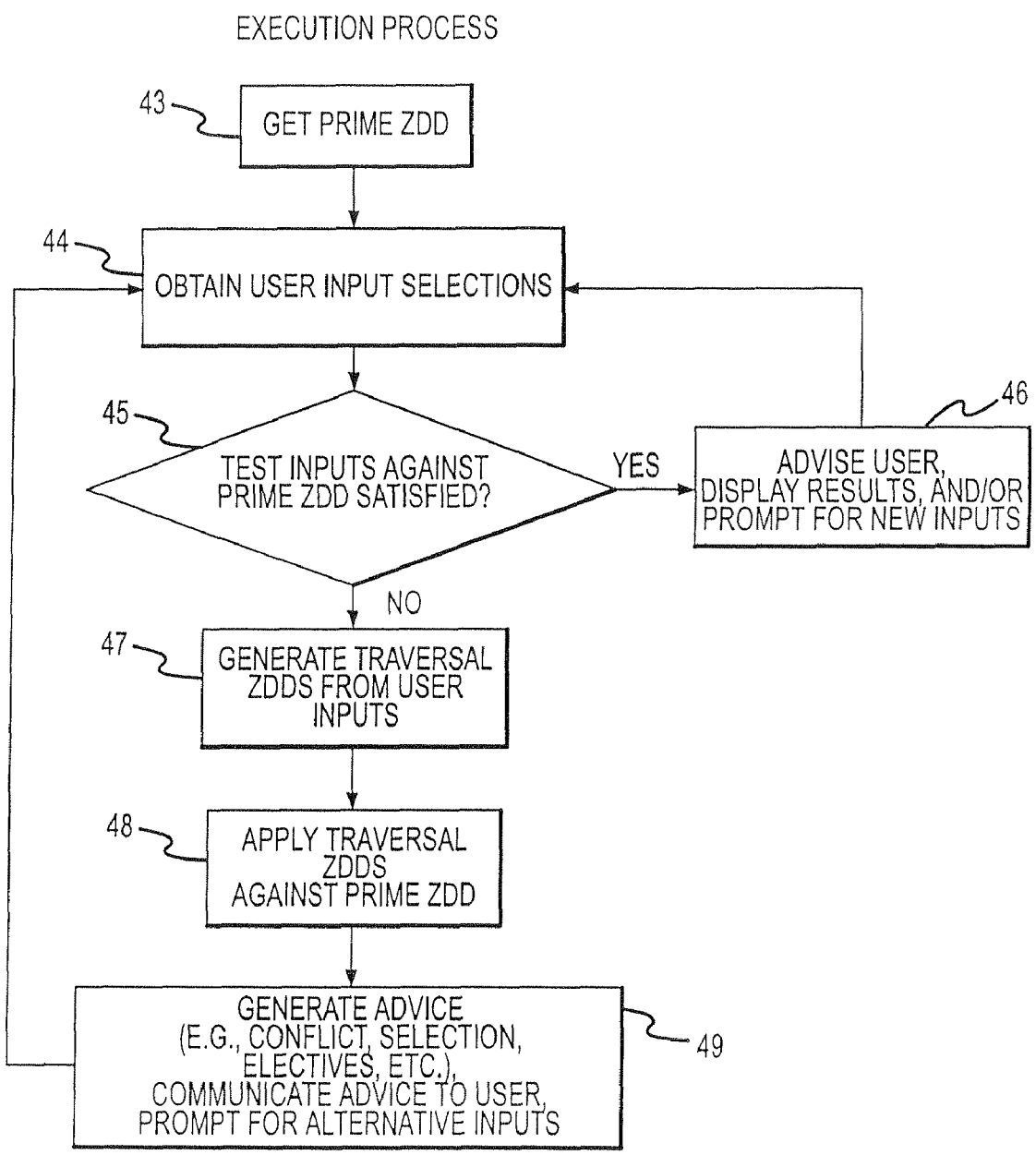
FIG. 1G conceptually illustrates an exemplary procedure implemented by the rule execution systems of FIG. 1C or 1D for executing the packaged rules developed by the rule packaging system of FIG. 1B.

FIG. 1G conceptually shows in sequential algorithmic form an exemplary procedure for a prime rule execution system 3 that retrieves, at procedure 43, the prime Zdd from database memory 23 (FIG. 1C). Retrieval may also occur by downloading via the Internet. The execution system 3 includes routines that implement a procedure 44 to obtain user inputs via a user interface 27 (FIG. 1C) that prompts a user to supply input selections or choices of rule parameters. Input selections may also be obtained from software components or other computing systems. In the example described herein, user inputs may include attributes and/or enumerations of material, pH, thickness, and pressure. The execution system 3 also has routines that implement testing 45 of input parameters against the prime Zdd to produce a result in the nature of "yes," which means the combination of user inputs is valid or satisfied; or "no," which means the combination of user input parameters is invalid or unsatisfied. If valid, the procedure performed by the execution system 3 proceeds to step 46 to advise the end user 11 (FIG. 1C) of satisfaction, messages, and/or the results of calculations (e.g., a price computation). If the result is invalid, the execution system 3 performs procedures 47, 48, and 49 to generate a series of traversal Zdds, to apply the Zdds against the prime Zdd, and to produce advice for user 11 (FIG. 1C), respectively. In practice, the algorithm actually implemented produces an indication of validity, conflict advice, and selection advice in a single pass. These procedures are subsequently explained. The advice provided may include conflict advice, selection advice, messages, or even further calculations. At this point, the advice is communicated to the end user, typically via a user interface of a computer monitor to enable input of revised parameters at step 32, whereupon the process is repeated.

Rule Entry & Maintenance

Figures 2A, 2B, 2C, 2D:
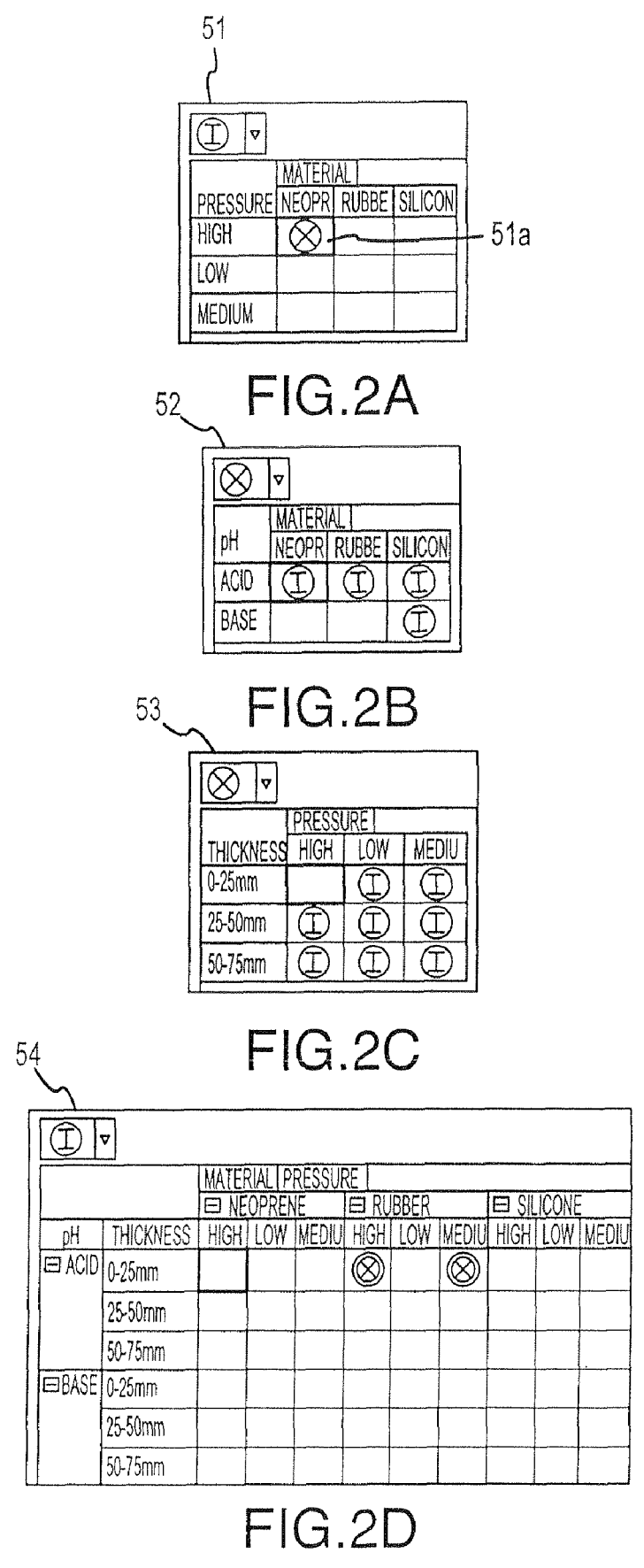

FIGS. 2A through 2D depict graphical representations of rule components in single and multidimensional grids setting forth the above-specified rule model, which is satisfied when each of the rule components is also satisfied. Using propositional logic, rule components of the overall rule model may be expressed in an include form, designated "I," or in an exclude form, designated "X," based on the type or nature of information to be entered in the rule component. Since rules are expressed in propositional logic, they may be restated in either form. An "I" or "X" in the upper left-hand corner 51, 52, 53, and 54 of the rule diagrams of FIGS. 2A through 2D shows the default setting of blank or non-specified locations in the grids of the rule component diagrams. FIGS. 2A and 2D show exclude rule components whereas FIGS. 2B and 2C show include rule components.

Using stock diagrams, e.g., diagrams with blank legends, automatically generated by a user interface of system 1 during the rule maintenance process, a subject matter expert develops a series of relationship diagrams characterizing the rule to be automated by specifying the appropriate labels, e.g., attributes or names, to be included in the legends. In effect, attribute relationships are also being defined during this process. During rule entry, these diagrams may be displayed on a computer monitor while data entry personnel or experts use a "point and click" input device to define rule components in the grids by clicking the appropriate locations of the grids. Placing an exclude "X" term 51a in the exclude rule component diagram of FIG. 2A, for example, effects a recordation of the rule that Neoprene cannot be used at high pressure. Similarly, placing include terms "I" at the illustrated locations of FIG. 2B effects recordation of the rule that only silicone can be used in basic environments while placing the include terms of FIG. 2C effect recordation of the rule a thickness greater than 25 mm must be used for high-pressure applications. The more complex rule diagram of FIG. 2D provides that rubber must not be less than 25 mm when used in acid above low pressure. As clearly evident, rules are advantageously captured according to this aspect of the invention without a need for programming skills and no syntactic programming code is required during rule definition.

Each rule represented in FIGS. 2A through 2D is set forth in a way to indicate validity or satisfaction of the rule component expressed therein. The exclude rule component of diagram 51, for example, is satisfied or valid when neoprene is not used with high pressure. The entries in the diagrams may also include an indication of or have an association with elective events, such as the conditions upon which predefined messages are displayed to an end user or calculations are performed to produce a result for the end user.

Figure 3:
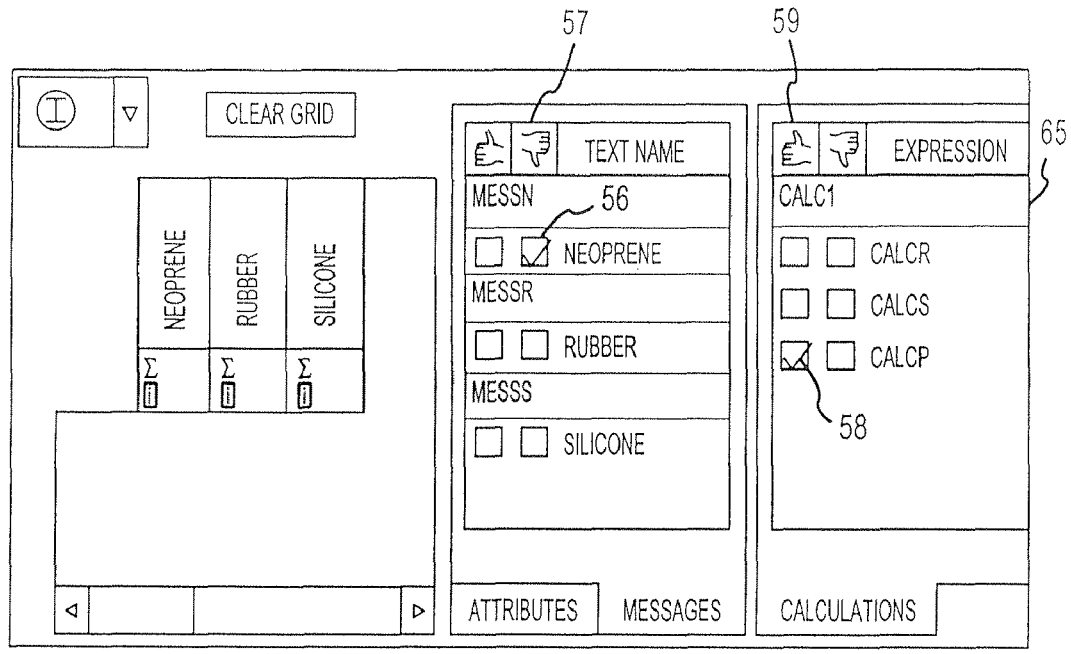
FIG. 3 illustrates a method of assigning an elective event, e.g., a calculation, to a result generated by end-user input selections.

FIG. 3 illustrates a user interface window displayed on a monitor to effect assignment of elective events to various conditions of validity (or invalidity) relative to the material attribute. To assign an elective event during rule definition, a subject matter expert uses a point-and-click device to place checkmark 56 in thumbs down column 57 to invoke message MessN when neoprene is valid, i.e., when neoprene is included in or selected for a product configuration. This will invoke the display or communication of MessN to end user 11 (FIG. 1C or 1D) when neoprene is selected in his or her input selections and the overall model is invalid. Checkmark 58 in thumbs up column 59 invokes the performance of calculation CalcP when both neoprene is valid in the selected product combination and the overall rule is valid or satisfied. Checking the thumbs up and thumbs down column respectively determine whether the associated elective event will be invoked during valid and invalid conditions, respectively, of the overall or prime rule model in response to the end-user input selections.

Figure 4:
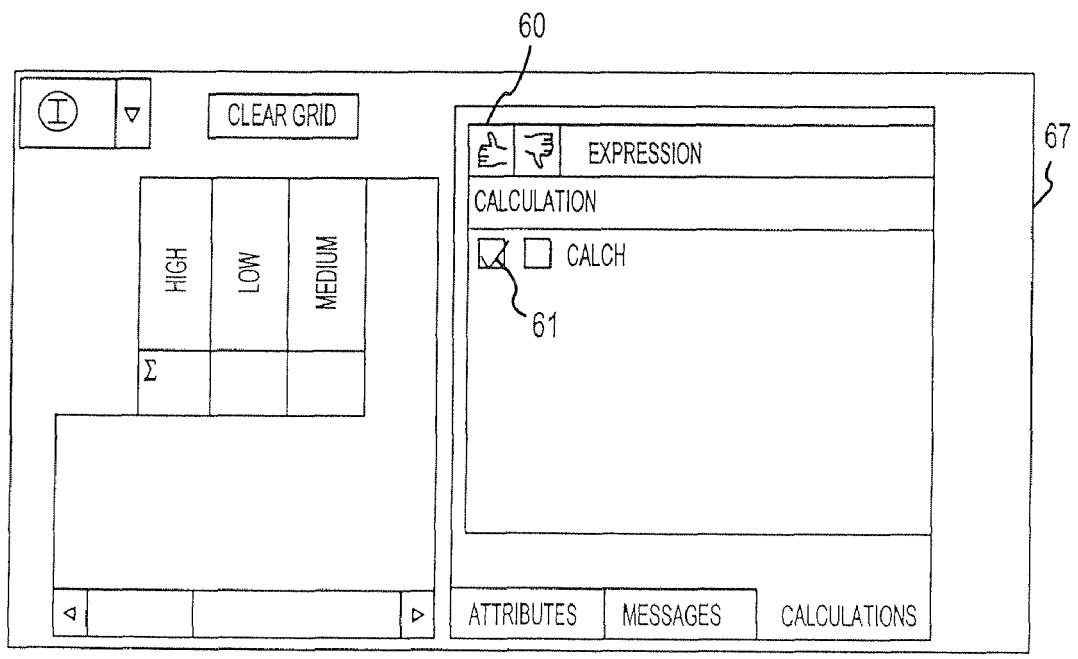
FIG. 4 illustrates a method of assigning another elective event, e.g., a message, to a result generated by end-user input selections.

Similarly, FIG. 4 illustrates an assignment of the performance of a calculation CalcH whenever pressure is high during conditions of validity of the overall rule, as shown by the checkmark 61 in thumbs up column 60.

Figure 5:
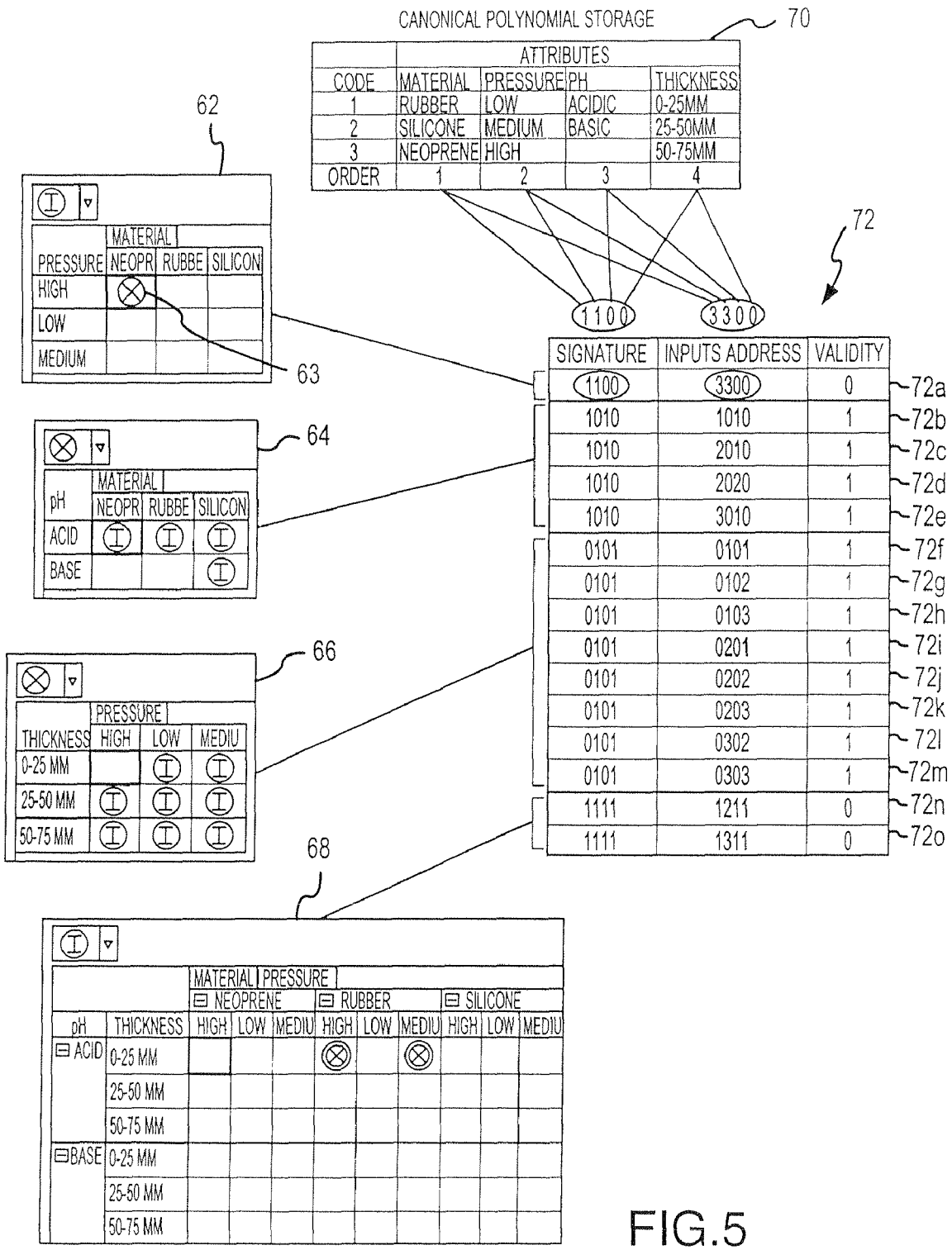
FIG. 5 illustrates how the exemplary rule components defined in FIGS. 2A through 2D are reduced to canonical polynomial storage where respective records thereof are uniquely addressed according to ordering of rule parameters.

FIG. 5 shows storage of the foregoing rule components in records 72a through 72o of a database 72 that represents the relationship information. Table 70 represents canonical polynomial storage of rules expressed in diagrams 62, 64, 66, and 68 in an ordered fashioned. The include and exclude relationships are specified in each diagram 62, 64, 66, and 68 so that the condition to be met therein renders the overall rule, i.e. prime rule, valid. In the illustrated example, the overall rule is a combination of all rule components reflected in diagrams 62, 64, 66, and 68, and is satisfied when all rule components reflected in the rule diagrams are satisfied.

To create records of master database 72, the terms of the relational diagrams 62, 64, 66, and 68 are given a signature, input address, and validity assignment in respective records 72a through 72o of database table 72, which is stored in a memory for subsequent access. Ordering of attributes and enumerations in table 70 associated with the specified attributes and enumerations is arbitrary, but once given, defines the signatures and input addresses of records of database table 72. Using left-to-right ordering across table 70, the signature in database table 72 associated with the term 63 for the neoprene-pressure rule of diagram 62 is "1100," which signifies the presence of a valid relationship (e.g., include or exclude) between neoprene "1" and high pressure "1" and a "don't care" relationship for pH "0" and thickness "0." Similarly, using the vertical ordering of the code specified in table 70, the input address associated term 63 of the neoprene-pressure rule diagram 62 becomes "3300," which signifies relative ordering of the enumerations of the neoprene "3" and pressure "3" attributes and "don't care" for pH "0" and thickness "0." The assignment of "zero" in the validity column of the neoprene rule 62 indicates an exclude rule assignment. In a similar fashion, the signature, input address, and validity assignments are provided for each asserted term of the rule components expressed in diagrams 64, 66, and 68 thereby to define in reduced canonical form in table 72 a prime rule embracing multiple rule components. Rule components expressed in the form of component diagrams 62, 64, 66, and 68 may be converted to database table 72 using conventional programming techniques. In accordance with an important aspect of the invention, the system accesses records 72a through 72o to create and manipulate Zdds representing the respective components of the prime rule to be automated.

FIGS. 6A, 6B, and 6C illustrate the step of defining and storing in reduced form certain elective information, e.g., the association of messages and calculations with certain conditions of satisfiability or unsatisfiability. User interface windows of FIGS. 6A and 6B correspond to FIGS. 3 and 4, respectively. Using an algorithm similar to that described for database table 72, elective information defined in windows 65 and 67 is generated and stored in corresponding records of an expanded table representation 69, as illustrated by records 69a, 69b, 69c, and 69d of table 69 to produce a condensed representation thereof. For purposes of illustration, entries in database table 69 omit "zeros" and is replaced with ellipses so that relevant information stands out. Alternatively, condensed elective event information of table 69 may be combined with table 72 or stored with associated records of table 72.

Rule Packaging

Packaging transforms a prime rule, which includes all rule components of interest, to an executable form. According to an important aspect of the invention, use is made of Zdds for rule processing because this form of rule representation accounts for the many "don't care" scenarios that customarily occur in many combinatorial exploded business and engineering systems. The nature, character, and manipulation of Zdds and similar diagrammatic propositional logic rule representations are described in "Zero-suppressed BDDs for set manipulation in combinatorial problems," S. Minato, Proc. 30th ACM/IEEE DAC, pp. 272-277, June 1993.

A prime Zdd, an elective Zdd, XML data, and supporting web documents are preferably created during rule packaging. The prime Zdd represents the overall, complex, or prime rule having multiple rule components. The elective Zdd represents elective events to be invoked when certain conditions occur. XML data and supporting web documents assist in generating and presenting the various user interfaces locally or remotely via a network A zdd (or z-bdd, or zero-suppressed bdd) is an OBDD (Ordered Binary Decision Diagram) that is further reduced by eliminating all nodes whose high legs go to zero. An Ordered Binary Decision Diagram is a special type of Directed Acyclic Graph (DAG). Zdds are especially efficient at manipulating sets of minterms, i.e., terms represented by selections in rule component diagrams 62, 64, 66, and 68. Nodes of a zdd can be reordered to further reduce the size of the diagram. In addition, reordering helps avoid traversing the same node more than once in order to reduce execution time when zdds are extremely large. Using special programming techniques such as dynamic programming and caching, it is possible to avoid many of these problems.

Zdds may be constructed using logical operations between two or more Zdds, which returns a result Zdd. Zdds may also be synthesized by directly linking chains of nodes to represent a result of many separate logical operations. Construction can be scaled up to handle very complex rules. Synthesis, however, can be much faster than construction when rule construction involves a large number of highly repetitive operations.

The synthetic method described in the appended pseudocode of creating a zdd starts at the largest index in the Index Table (set forth below), which also happens to be at the bottom of the zdd, and works its way up the zdd. The synthetic method uses a zdd "one" function and synthetically AND'ing in each term in a minterm to create a zdd representing a rule component. As it goes up the zdd it applies the specific synthetic operation to that node. Using this method, it is easy to build a chain of AND operations in one pass, whereas using the logic construction method requires passing each member of the AND chain. Each pass, of course, takes greater than linear time to process. As later described in this disclosure, a "Selection Term For Group" is created in a synthetic fashion. The zdds preferably have an order with "missing" node locations where the level of a node present in the zdd corresponds to its index position. Empty levels having no nodes represent suppressed "zeros" or "don't cares." This ordering, however, is not required.

Ordering of attributes, enumerations, etc. is arbitrarily assigned during rule development. Rules express relationships between sets of enumerations grouped into attributes. When speaking of a logic function implied by one or more rules, enumerations are called "terms" (as in a "term" of a logical expression). When constructing a zdd each enumeration (term) of the example described herein is identified by a specific numeric "index," set forth in the following index table:

Index Table

| Index | Name | Group |
| --- | --- | --- |
| 0 | Rubber | 0 |
| 1 | Silicone | 0 |
| 2 | Neoprene | 0 |
| 3 | Low | 1 |
| 4 | Medium | 1 |
| 5 | High | 1 |
| 6 | Acidic | 2 |
| 7 | Basic | 2 |
| 8 | 0-25 mm | 3 |
| 9 | 26-50 mm | 3 |
| 10 | 51-75 | 3 |

Enumerations of an attribute are mutually exclusive (i.e., a particular pH cannot be both acidic and basic). Groups, therefore, specify the exclusive relationship between terms. The concept of grouping is used throughout construction and execution to enforce exclusivity between group members. Group types are either elective or prime, and are used when building a selection term for the elective zdd. Prime groups correspond to attributes.

Logic operations are used during creation and execution of the zdds. Standard functions include AND (intersect) and OR (union). A AND function is used between two sets of zdd nodes to find the nodes or paths in common between the groups. An OR function is used to find a total set of zdd nodes and paths between two zdd groups. Since zdds contain sets of minterms, the union/intersection nomenclature to refer to zdd functional operations is more appropriate.

An overall rule model comprises at least a prime zdd and an elective zdd. The prime zdd is packaged from respective sets of include rules and exclude rules, i.e., rule diagrams 62, 64, 66, and 68 (FIG. 5) created by a subject matter expert. The prime rule model, however, may include a collection of three zdds including an include zdd, an exclude zdd, and optionally, an attribute relationships zdd.

Include zdds contain rules with combinations that go together (i.e., combinations that are valid) but are not effective for containing rules with combinations that do not go together (i.e., combinations that are invalid). In an exemplary situation where a product can be built with 300 sizes and 200 colors, resulting in 60,000 possible combinations, all combinations are valid together except for three. That means that there are 59,997 valid combinations and three invalid combinations.

According to an aspect of the present invention, rules may be re-stated either as an include rule or an exclude rule in a way to minimize the number of nodes in a corresponding zdd representing the rule. Storing invalid combinations, e.g., the three invalid combinations, requires OR'ing the exclude rules together, rather than AND'ing. In this case, fewer actual nodes result from the operation but one encounters the same pathological ordering problem when storing the logic function in a standard (include) zdd. This is because the 59,997 "don't care" nodes are explosively multiplied by the OR operation. However, in this case, the "don't care" nodes add no actual information and can be eliminated. Thus, in accordance with an aspect of the present invention, the structure of the exclude zdd is changed to suppress or eliminate the "don't care" nodes representing "don't care" scenarios in business or engineering applications to advantageously achieve a reduced size with no loss of information.

Thus, the include zdd and exclude zdds are constructed differently and, during execution, each of them is separately traversed without regard to the other. This, according to another important aspect of the invention, permits separate creation, manipulating, and re-ordering to further simplify very complex rules that would other have a large number of nodes.

After creating the Zdds, they are persisted to permanent storage to be subsequently retrieved during execution. Zdds are preferably persisted using a format that includes header information, variable ordering information, and node information, as depicted in FIG. 20.

Building an Include Zdd

Figure 7:
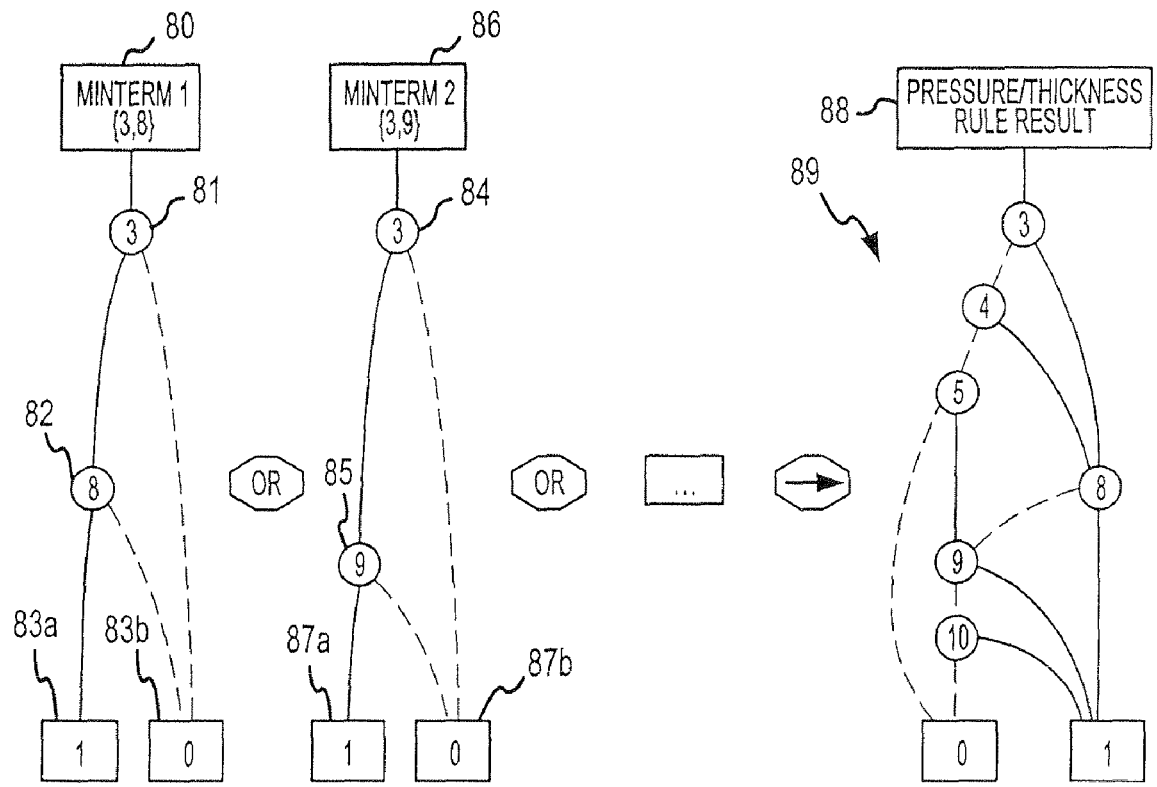
FIG. 7 illustrates building an "include" Zdd rule to characterize "include" rules illustrated in the rule diagrams of FIGS. 2B and 2C.

FIG. 7 illustrates how the system builds an exemplary include zdd for the exemplary material-pH and pressure-thickness rules (rule diagrams 64 and 66 (FIG. 5)). The include zdd, however, preferably embodies all include rule components and related information and is created by AND'ing the include rule components. Each include rule component is created by OR'ing the minterms specified in the rule components (i.e., entries of rule diagrams 64 and 66 of FIG. 5). The individual minterms are created using a zdd "one" function and synthetically AND'ing in each term of the minterms. All terms that belong to groups specified for this rule start out at zero. This has the effect of assigning all terms not specified in groups to "don't care" and all other non-specified terms to "zero."

When building an include zdd, the relevant attributes define the rule being built. Other attributes are seen as "don't care" (DC) with respect to the relevant rule. Explicitly building (referencing) the "don't cares" is not necessary for the include zdd due to inclusion of an attribute relationship zdd in the prime rule. The attribute relationship zdd defines how the attributes are interrelated. Unrelated attributes can then be processed as "don't cares" during execution.

As shown in FIG. 7, the levels or positions of nodes 81, 82, 84, and 85 of the zdds correspond to the aforementioned index in the index table. The pressure-thickness rule has eight minterms (eight entries in rule diagram 66 (FIG. 5)), two of which are shown in FIG. 7. During processing to create the zdds, information for the minterms are retrieved from database table 72 stored in memory. Minterm 80, designated as {3,8}, signifies a valid condition for the combination of low pressure and a thickness of 0-25 mm. A zdd comprising nodes 81 and 82, along with result 83a and 83b, represents the zdd for minterm 80. Solid lines from node 81 to node 82, along with a solid line from node 82 to the "1" box 83a, signify a valid or satisfied condition for low pressure and thickness between 0-25 mm. Nodes for other attributes and enumerations are not represented in the zdd for minterm 80 since, for the relevant minterm, they are irrelevant, i.e., "don't care."

Similarly, minterm 86 representing the relationship {3,9} signifies a valid condition for the combination of low pressure and a thickness of 25-50 mm. Its zdd is constructed in the same or a similar fashion from nodes 84 and 85, along with results 87a and 87b. Since the combination is valid, node 85 has a solid line to "one" box of 87a. The entire pressure-thickness rule has eight minterms {3,8}, {3,9}, {3,10}, {4,8}, {4,9}, {4,10}, {5,9}, and {5,10}, which represent the eight entries in the rule diagram 66 of FIG. 5. Zdds for each of the eight minterms are similarly created. OR'ing all eight zdds using conventional manipulation techniques yields a zdd for pressure/thickness rule result 88 comprising a zdd node structure 89 that logically represents the entire pressure-thickness rule.

Figure 8:
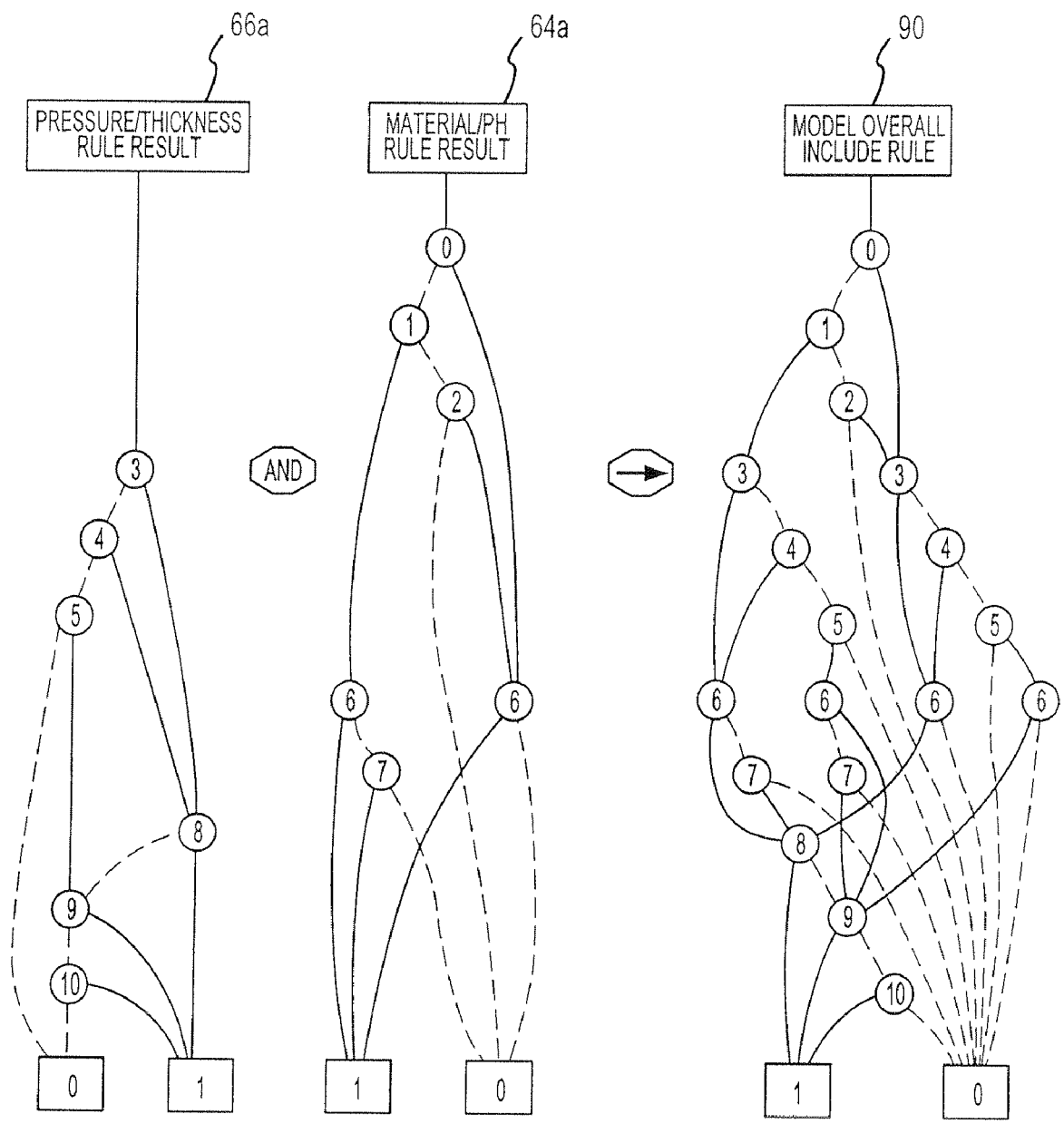
FIG. 8 further illustrates building an "include" Zdd rule to characterize "include" rules illustrated in the rule diagrams of FIGS. 2B and 2C.

FIG. 8 shows AND'ing the "include" material-pH rule component 64a and the "include" pressure-thickness rule component 66a that are correspondingly depicted in rule diagrams 64 and 66 (FIG. 5) in order to form an overall include rule 90. As seen, the overall include model 90 has a more complex arrangement of nodes. The model's overall include zdd grew quite quickly. According to an aspect of the invention, this zdd may be reordered to reduce the number of nodes. For example, zdd 90 can be reordered in a way that would shrink it from eighteen to eleven nodes. After reordering and persisting to memory, it is ready to be used during execution, which is subsequently described.

Building an Exclude Zdd

Figure 9:
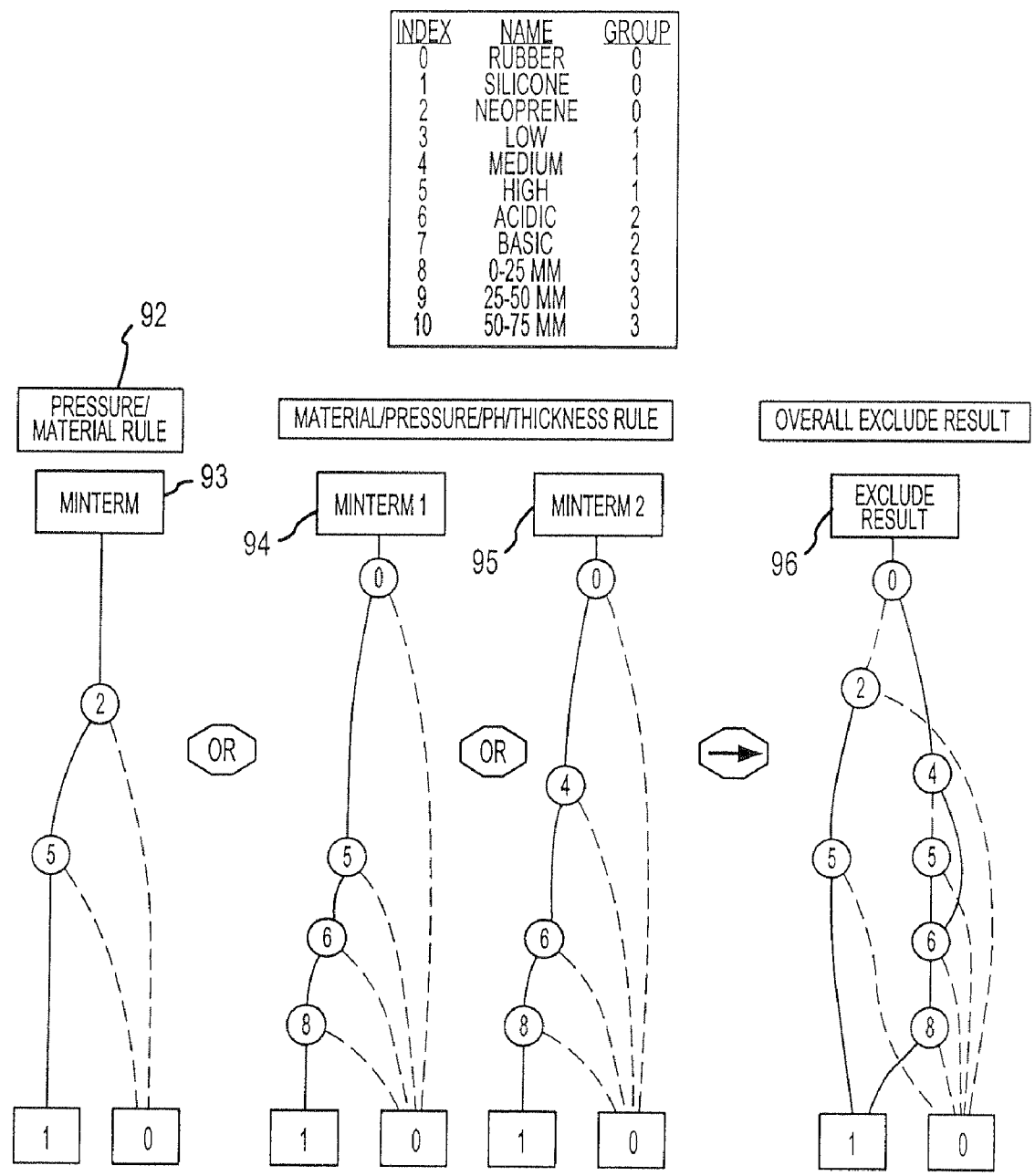
FIG. 9 illustrates building an "exclude" Zdd rule to characterize "exclude" rules illustrated in the rule diagrams of FIGS. 2A and 2D.

FIG. 9 illustrates building exclude zdds indicative of propositional logic rules represented by rule components of rule diagrams 62 and 68 (FIG. 5). The exclude zdd embodies information from the exclude rules and their structure differs from the include zdds. As shown in FIG. 9, exclude rules are built by OR'ing, minterms, including the single term of pressure/material rule and the two minterm of the material/pressure/pH/thickness rule. Using conventional programming code, initial data about the definition of each rule to develop its corresponding zdd structure is obtained from database table 72 (FIG. 5).

A first "exclude" rule, relation, or minterm 93 of material/pressure rule component (diagram 62 (FIG. 5)) provides that neoprene cannot go with high pressure, which is designated {2,5} according to entries in the index table. A second "exclude" rule has two minterms 94 and 95 derived from the Index Table as {0,5,6,8} and {0,4,6,8}, and which is satisfied, for the exemplary prime rule, on the condition that rubber must not be less than 25 mm when used above low pressure. Starting with a "one" zdd and then AND'ing each term in the minterm creates the individual minterms 93, 94, and 95. A result zdd 96 is formed from a union, e.g., OR'ing, of zdd representing "exclude" minterms 93, 94, and 95. As apparent, forming the "exclude" zdds comprises a more direct one-step process, instead of the two-step process required for the include result. Forming the "include" zdd involves OR'ing the minterms for each of the respective rule components, and then AND'ing the result of the OR'ing operation for each rule component.

Building an Attribute Relationships Zdd (AttrRels)

Figure 10:
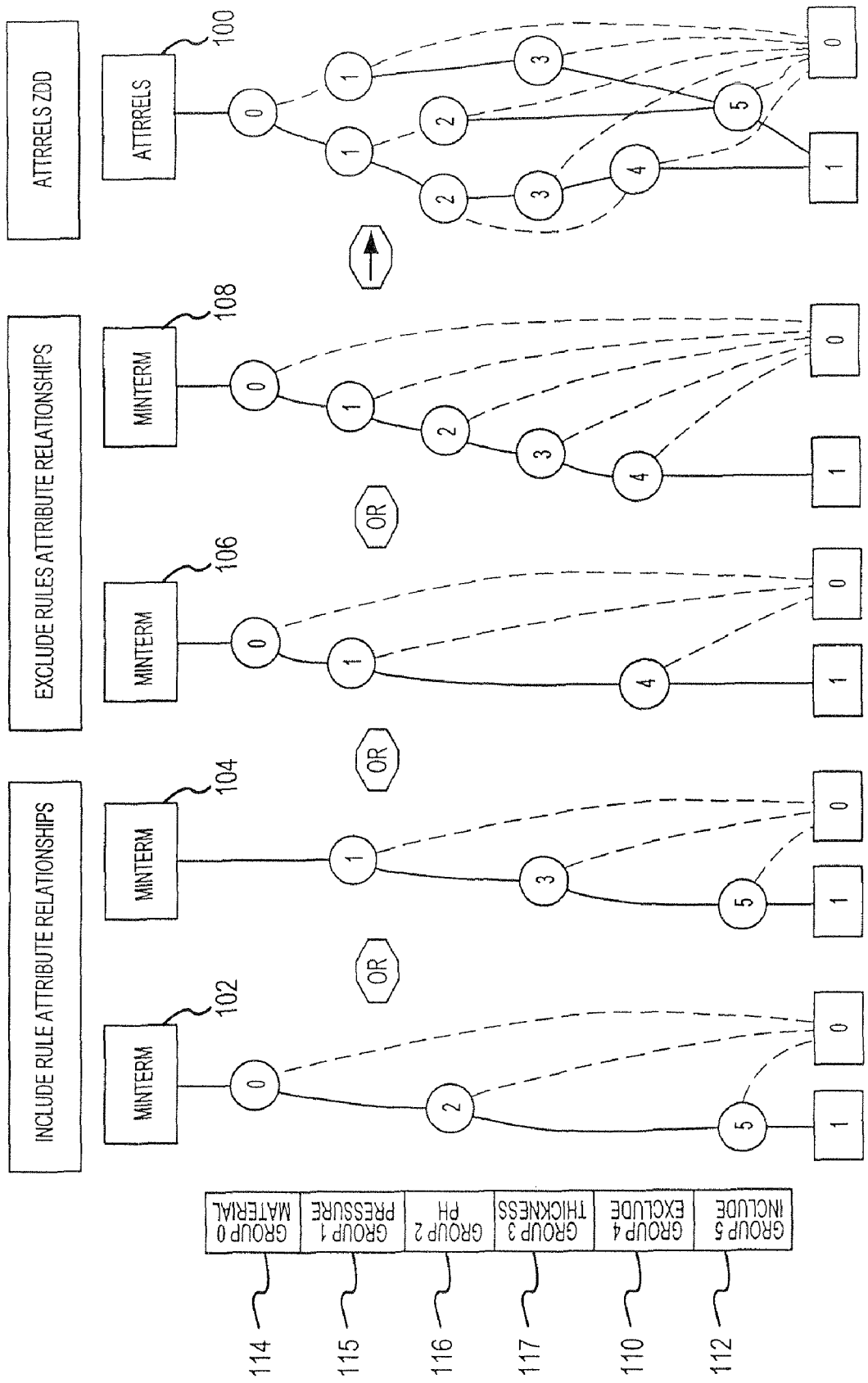
FIG. 10 illustrates building attribute relations Zdd according to rule components defined in FIGS. 2A through 2D.

Referring to FIG. 10, the AttrRels zdd 100 is used during execution to control the construction of a Make Selection Term for Group (MSTFG) zdd used for the "include" and "exclude" advice. As indicated herein, one advantage of the invention deals with providing selection and conflict advice for the terms or parameters of interest selected by an end user. That advice is provided in the form of "include" and "exclude" advice, that is, to provide identities of terms, parameters, enumerations, etc. that should be included or excluded in the user selections to render a non-compliant rule compliant, and vice-versa.

When building the AttrRels zdd 100, two extra terms corresponding to groups 110 and 112 are added to the Index Table, one term to designate an "include" relationship and a second term to designate an "exclude" relationship. The remaining groups 114-117 correspond to the group demarcations in the Index Table. During execution, these terms advantageously allow separation of "include" attribute relationships from the "exclude" attribute relationships to guide an end user during the selection process when developing his or her "terms of interest" to satisfy a complex rule.

Unlike the include zdd and exclude zdd, terms of the AttrRels zdd represent attributes (i.e., groups) rather than enumerations. For "include" rule diagrams 64 and 66 of FIG. 5, it is seen (i) that material (group zero) is related to pH (group 2) and (ii) that pressure (group 1) is related to thickness (group 3). For the "exclude" rule diagrams 62 and 68 of FIG. 5, it is seen (i) that material is related to pressure and (ii) that material (group zero), pressure (group 1), pH (group 2), and thickness (group 3) are interrelated. A table similar to table 70 (FIG. 5) may also be constructed for the AttrRels relationships. An exclusivity relationship exists between the enumerations of an attribute. However, because no such exclusivity relationship exists between attribute relationships, exclusivity is not a consideration when constructing the AttrRels zdd.

Thus, construction of the "include" attribute relations zdds 102 and 104 for the material/pH and pressure/thickness rules is rather straightforward. The "include" AttrRels zdd is constructed from minterms {0, 2, 5} and {1, 3, 5}, where "5" is added to indicate an "include" rule. The "exclude" AttrRels zdd is constructed from minterms {0,1,4} and {0,1,2,3,4}, where "4" indicates an "exclude" rule.

Prime Zdd Post Processing

After constructing the include zdd and exclude zdd, paths common to both include and exclude zdds may optionally be removed from the include zdd without loss of information. This renders the include zdd smaller and makes execution faster. Removing these paths from the include zdd avoids extraneous processing of traversing those paths during the execution of the zdd. As an example, if a rule is added to the "exclude" zdd precluding the combination of the material neoprene and the pressure 50-75 mm (i.e., index 2 and index 10), then any combination containing both neoprene and 50-75 mm (index 2 and index 10) in the "include" zdd can be removed regardless of other combinations in the rule. Thus, another aspect of the invention concerns searching for and removing paths in the include zdd that contains the "excluded" combination. Therefore, valid combinations {2,5, 10} and {2,10,15}, and {2,8,10,30} can be removed from the include zdd because they each contain "2" and "10". In this hypothetical scenario, these terms don't add any value to the include zdd.

Prime zdd post processing also removes unnecessary information from the include zdd to enhance the end user's experience of selection advice by flagging combinations as incompatible selections in the special case where the end user has made no actual selection for one or more related attributes (i.e. has a pending choice). The following pseudocode describes how the prime Zdd is constructed:

RemoveTotallyExcluded

---

```
Given:
   IncludeZdd = the zdd with all the include paths.
   ExcludeZdd = the zdd with all the exclude paths.
// Caution:  This function must be called on non-reordered zdds.
Function RemoveTotallyExcluded(IncludeZdd, ExcludeZdd)
   Zdd     tNext, eNext, r
   If ExcludeZdd == 1 Then return 0
   If ExcludeZdd == 0 Then return IncludeZdd
   If IncludeZdd == 0 or IncludeZdd == 1 Then return IncludeZdd
   If (index(ExcludeZdd) < index(IncludeZdd)) Then
      r = RemoveExcluded(IncludeZdd, Lo(ExcludeZdd))
   Else If (index(IncludeZdd) == index(ExcludeZdd)) Then
      tNext = RemoveExcluded(High(IncludeZdd), High(ExcludeZdd))
      eNext = RemoveExcluded(Lo(IncludeZdd), Lo(ExcludeZdd))
      r = MkZ(index(IncludeZdd), tNext, eNext)
   Else
      tNext = RemoveExcluded(High(IncludeZdd), ExcludeZdd)
      eNext = RemoveExcluded(Lo(IncludeZdd), ExcludeZdd)
      r = MkZ(index(IncludeZdd), tNext, eNext)
   End If
   Return r
End Function
```

Constructprimezdd—Code to Build the Include, Exclude and AttrRels Zdds.

```
Given:
    Model = data for the model.
Function ConstructPrimeZdd(Model)
    // Comment: Construct the Include
    PrimeIncludeZdd = 1
    For each include rule in a Model
        RuleZdd = 0
        For each minterm in rule
            MintermZdd = 1
            For each term in mintermc
                Synthetically add the term to MintermZdd
            Next term
            RuleZdd = RuleZdd or MintermZdd
        Next minterm
        PrimeIncludeZdd = PrimeIncludeZdd and RuleZdd
    Next rule
    // Comment: Construct the Exclude
    PrimeExcludeZdd = 0
    For each exclude rule in a Model
        For each minterm in rule
            MintermZdd = 0
            For each term in minterm
                MintermZdd = MintermZdd or term.
            Next term
            RuleZdd = RuleZdd or MintermZdd
        Next minterm
        RuleZdd = RuleZdd or MintermZdd
        PrimeExcludeZdd = RuleExcludeZdd or PrimeZdd
    Next rule
    // Comment: Construct the AttrRels
    AttrRelsZdd = 1
    For each rule in a Model
        If rule is an include rule then
            MintermZdd = include term
        Else
            MintermZdd = exclude term
        End if
        For each attr in rule
            Add attr to MintermZdd
        Next attr
        AttrRelsZdd = AttrRelsZdd and MintermZdd
    Next rule
    PrimeIncludeZdd  = RemoveTotallyExcluded(PrimeIncludeZdd,
    PrimeExcludeZdd)
    // Comment: Reorder and persist the zdd's
    ReorderAndPersist PrimeIncludeZdd
    ReorderAndPersist PrimeExcludeZdd
    ReorderAndPersist AttrRelsZdd
End Function
```

Elective Zdd Structure

Elective events are actions that occur in response to end-user selections of "terms of interest" and/or prime advice, the objective being to trigger certain events when making certain selections. Elective events may effect the display of messages and/or the performance of calculations to be used with a particular outcome or result.

Figure 11:
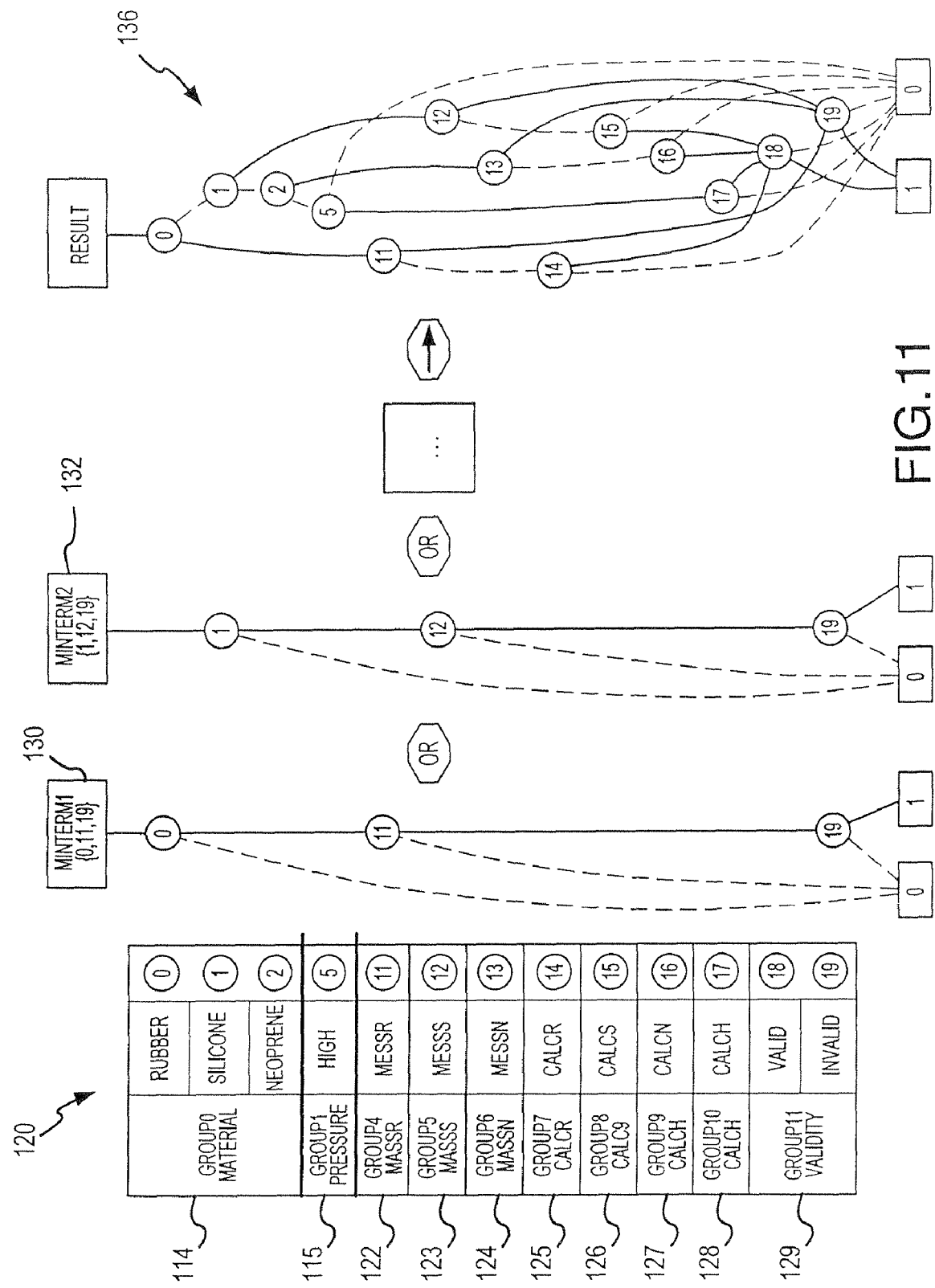
FIG. 11 illustrates building the elective events Zdd according to the events assigned to rule outcomes, such as the events assigned by the illustration shown in FIGS. 3 and 4.

FIG. 11 shows construction of an elective zdd. There is no differentiation between include and exclude elective zdd rules. An elective zdd embodies information about the elective events for a given rule component or rule model. In the elective zdd, the elective events are also represented as minterms 130, 132, etc. Elective zdd 136 is built by OR'ing elective minterms 130, 132, etc. that have associated messages and calculations. The minterms comprise prime terms, a validity term (or an invalidity term), and the elective event terms. Starting with a "one" zdd function and synthetically AND'ing terms of the minterm 130, for example, creates the zdd 130. Exclusivity is not a consideration in the construction of elective minterms. After the elective zdd is constructed, the indexes of the zdd can be reordered to further reduce the number of nodes in the zdd. Because they are functionally independent, the elective minterms may be OR'ed, which produces a sum of sum of products (SoSoP) zdd. Unfortunately, a SoSoP zdd may have an exponentially exploded number of nodes when don't cares (DC's) are explicitly expressed. This situation is similar to that described for the exclude zdd. Fortunately, when using the elective zdds, the "DC's" may be eliminated without loss of information. Therefore, the elective zdd may use a structure similar to the exclude zdd.

FIG. 11 shows only the first two minterms of the elective rules: Neoprene uses CalcN if valid and displays MessN if invalid; and Silicone uses CalcS if valid and displays MessS if invalid. Rubber uses CalcR if valid and displays MessR if invalid; and High pressure uses CalcH if valid. According to ordering contained in group 120, the resulting minterms of the elective zdd are $\{0, 11, 19\}$, $\{1, 12, 19\}$, $\{2, 13, 19\}$, $\{0, 14, 18\}$, $\{1, 15, 18\}$, $\{2, 16, 18\}$, and $\{5, 17, 18\}$.

Since DC's are not present in the elective zdd 136 an alternate select function, SelectE, may be used. The selection term zdd used by the SelectE function is built in light of the structure of the elective zdd.

In addition to the prime, message and calculation groups 114-115 and 122-128, a new group 129 called validity is added to the elective zdd group 120. Group 129 allows the user to specify different behaviors based on the validity of the prime. Elective events can be set up to show Message1 if the selected combination is valid, or Message2 if the combination is invalid. The value of prime validity is determined during processing and interpretation of prime advice.

Pseudocode for building the elective zdd is as follows:

```
Given:
    Model = data about the model.
Function ConstructElectiveZdd(Model)
    ElectiveZdd = 0
    For each rule in Model
        If rule has an ElectiveEvent
            For each ElectiveEvent in rule
                MintermZdd = 1
                // Comment: Make sure to include the validity or invalidity term.
                For each term in ElectiveEvent
                    MintermZdd = MintermZdd and term
                Next
                ElectiveZdd = ElectiveZdd or MintermZdd
            Next
        End if
    Next
End Function
```

Execution Engine

The rule execution engine according to an aspect of the invention preferably implements a validity algorithm and an advice algorithm. The validity algorithm contains an irredundant, reduced representation of the multidimensional prime rule in a specialized, addressable table format and uses Zdds, or a representation thereof, to deterministically process an input vector, i.e., user selections, comprising input parameters of a complex rule. Generally, a binary decision diagram is a reduced, ordered, rooted, directed acyclic graph of the logic function $f(m, n)$ that is well-suited to characterize a deterministic rule. Although preferred, the invention need not employ zero-suppressed diagrams. Related binary or logical representations, such as BDDs, BMDs, MBDD, or other graphical diagrams or logic representations may be used in accordance with the teachings herein.

In one embodiment, a local or remote server runs the execution engine. Also, a client device may run the execution engine. In a client-server environment, rule entry, packaging, and execution are preferably divided between client and server devices according to needs of the application. In most cases, however, the set of zdds representing the overall rule model is small enough to run on a typical client computer, e.g., a conventional desktop, laptop, or palm-type computing device, and may be downloaded from a remote server, e.g., Internet server, by the end-user just prior to execution. When the execution engine starts, a microprocessor of the execution terminal effects loading of pre-packaged zdds, obtains inputs (i.e., terms of interest) from a user, begins execution, and provides an output, preferably on a computer monitor. The output may comprise visual and/or audio indications, and preferably includes an indication of satisfiability along with an indication of conflict and/or selection advice after traversing the user-specified inputs through the pre-packaged prime zdd representing the overall rule model.

Figure 12:
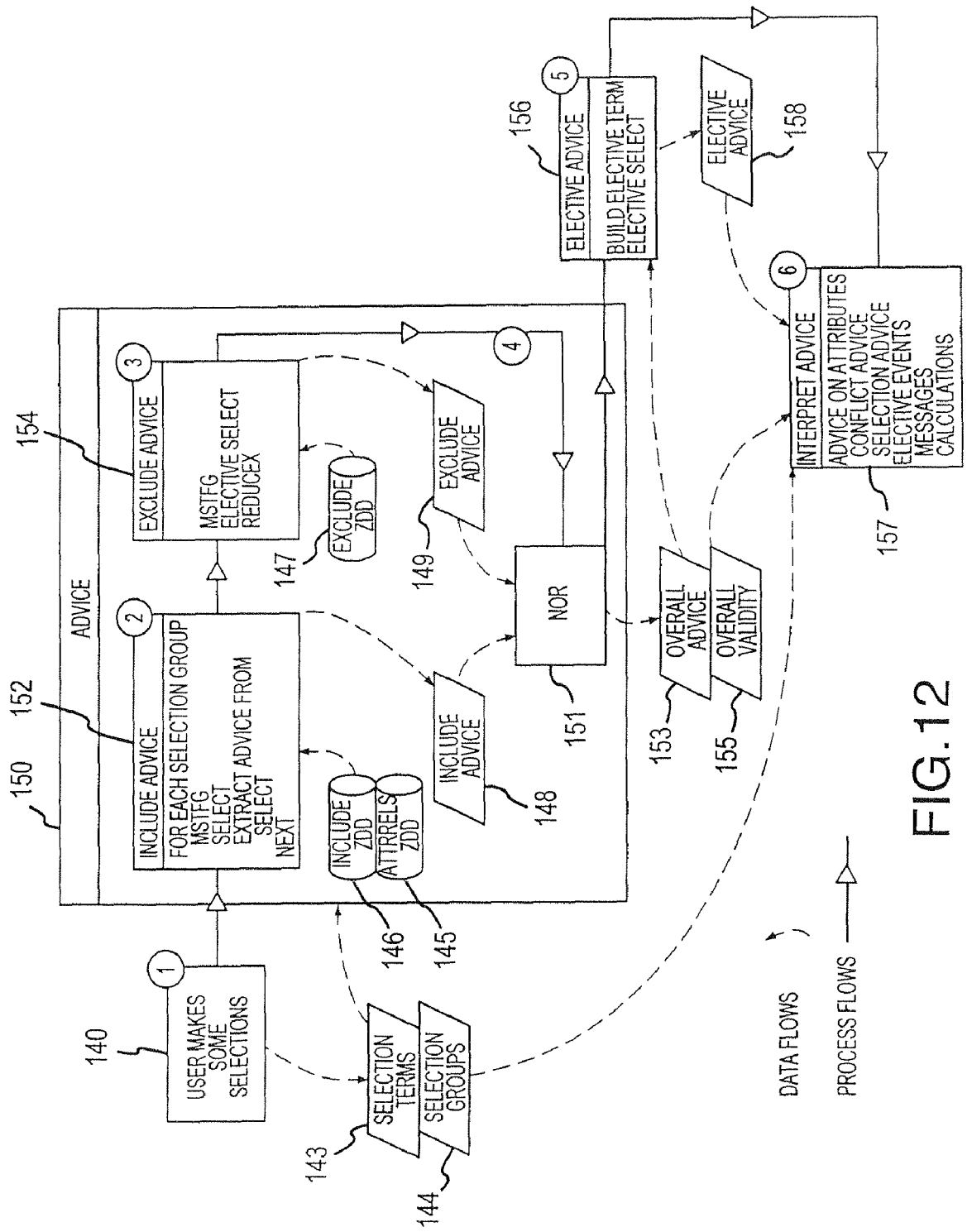
FIG. 12 illustrates a preferred procedure for executing or automating a prime rule to produce a result, preferably including conflict and selection advice, based on a set of end user inputs.
Figure 13:
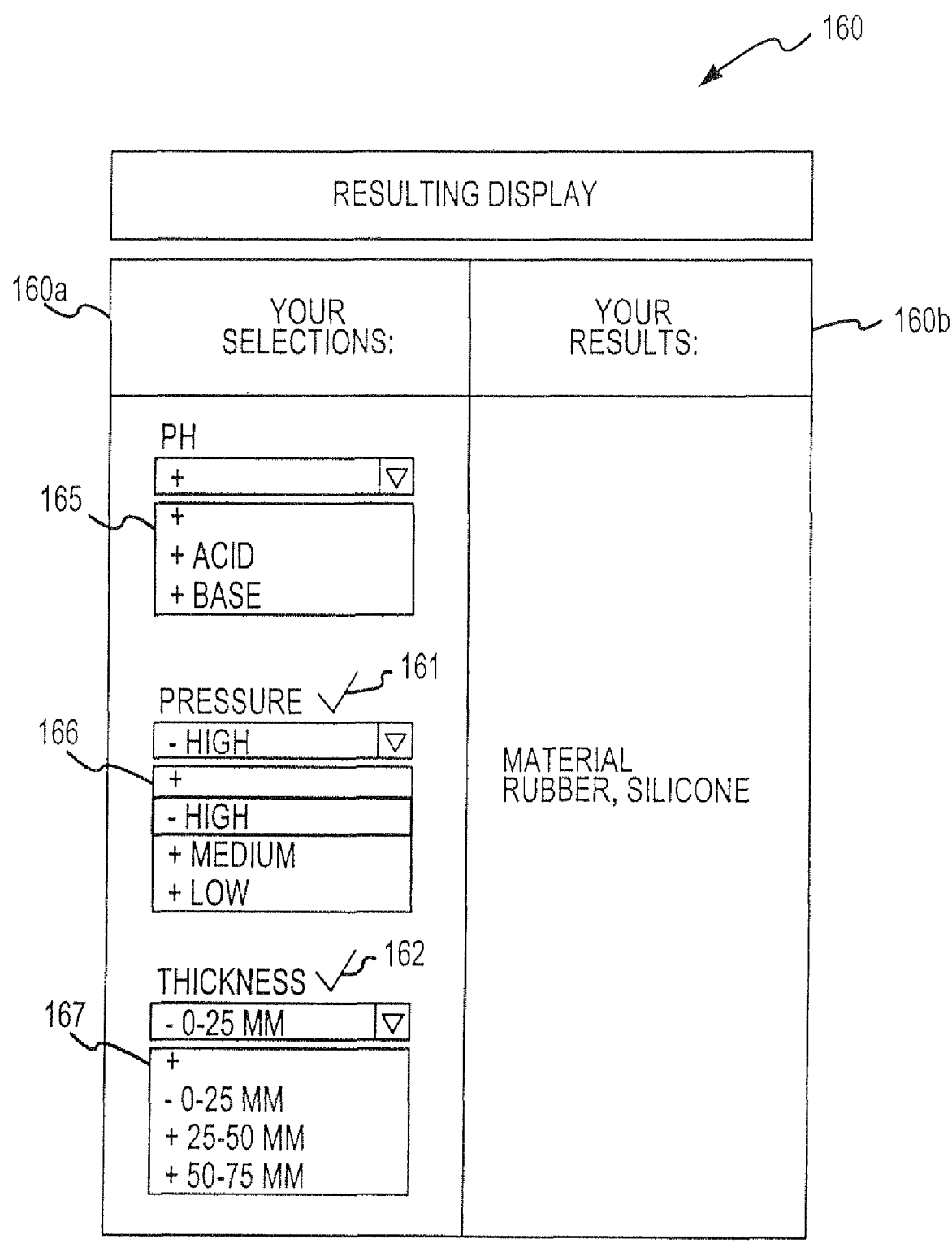
FIG. 13 shows one possible user interface for displaying user selections and results.

FIG. 12 shows an exemplary method and apparatus for executing a pre-packaged prime zdd that includes an include zdd, an exclude zdd, an attribute relations zdd, and an elective events zdd previously generated for an overall or prime rule model where the dashed lines represent data flows and the solid lines represent process flows. At step 140, a user interface of a workstation provides to an end user a list of possible choices or selections among terms, attributes, parameters, etc. obtained from selection terms 142 and selection groups 144. Here, the user inputs his or her selections. A user may also comprise a machine or data processing device that automatically generates these selections based on certain monitored events or conditions. Typically, a human end user makes selections from a series of dropdown menus 165-167, as depicted in FIG. 13. The terms and groups are derived from packaged zdd information generated during rule entry. After making selections, an Advice module 150 builds temporary traversing zdds that traverse the pre-packaged zdd components developed during the packaging process. New temporary traversing zdds are generated each time the user changes or updates the selections or inputs.

The Include Advice module 152 carries out steps including, for each selection group derived from the user inputs, making a selection term for the group (MSTFG) by calling a routine that uses the selection terms and groups to synthetically create an include traversal zdd that is used to extract information from the Include zdd 146 and AttrRels zdd 145. Using the temporarily generated include traversal zdd, Include Advice module 152 effects traversal of the pre-packaged Include zdd 146 and AttribRels zdd 145 to produce "include" advice 148. The Exclude Advice module 154 carries out steps including, for each selection group derived from the user inputs, making a selection term for the group (MSTFG) by calling a routine that uses the selection terms and groups to synthetically create another traversal zdd that is used to extract information from the pre-packaged Exclude zdd 147. Using the same end-user selections, Exclude Advice module 154 generates a temporary exclude traversal zdd and effects traversal of the pre-packaged zdd data 147 to produce "exclude" advice 149.

Include Advice 148 produced by module 152 and Exclude Advice 149 produced by module 154 are NOR'ed by the execution system at step 151 to produce overall advice 153 and validity advice 155. Meanwhile, module 156 generates information useful for providing a selection of elective events, i.e., messages and/or calculations, associated advice results should this feature be included in the application. Elective Advice module 156 builds the elective terms to be supplied to the ElectiveSelect routine in order to produce Elective Advice 158 that is supplied to an Advice Interpretation module 157. Module 157 generates selection and conflict advice, as well as effecting display of messages and results of calculations, that guides or assists the end-user. In addition, a reduction operation ReduceX is used to remove any combinations that are more than one click ahead.

FIGS. 12 and 13 together illustrate execution and display of results relative to automating a decision involving an overall or prime rule model to generate an indication of validity, satisfiability, or compliance according "terms of interest" selected by an end-user at step 140, as well as to produce conflict and selection advice relative to terms of interest provided by the end-user. Using a point-and-click input device relative to display window 160 of a computer monitor, the end-user selects terms of interest (e.g., the end-user selects desired enumerations among pH, pressure, and thickness) using drop-down menus 165, 166, and 167. Dropdown menus show enumerations for the pH, pressure, and thickness parameters that were previously defined by the subject matter expert or data entry personnel during rule definition. Pane 160b shows the result parameters, e.g., attributes that render the selection valid in the overall rule model. Advantageously, the end-user may arbitrarily arrange the parameters shown in panes 160a and 160b thereby customizing the desired inputs and outputs of the overall rule model according to his or her needs or desires.

Validity of the overall rule model is preferably based on a current set of terms of interest selected by the end-user. If the user-selected terms of interest are compatible with each other and every attribute that doesn't have a current selection has at least one possible term, then the overall rule model is valid. Otherwise the overall rule model is considered to be invalid. In FIG. 13, a "+" notation, i.e., selection advice, of an enumeration of an attribute appearing in dropdown menu 165-168 indicates a selection that renders the overall rule compliant. A "−" notation indicates an incompatible or non-compliant selection. Other nomenclature may be used to indicate conflict and selection advice.

Since conflict and selection advice are immediately provided to the end user, the execution engine advantageously provides a design tool when developing desired configuration of a complex product, service, facility, etc. having a combinatorial exploded number of possible combinations, many of which are "don't care" scenarios.

When the execution engine produces an invalid result, advice function 150 (FIG. 12) uses an include module 152 and/or exclude module 154 to guide the user to compliancy by pointing out where one or more conflicts exist. When examining the results of Advice function 150, if the terms of interest are found to be included in the results, the user's selections are valid. The validity value is later added to the terms for an ElectiveSelect function 156, subsequently described. Terms not returned in the result of Advice function 150 are the conflicting terms. Other terms produced in the result of Advice function 150 are compatible options for the terms of interest. The compatible terms may resolve conflicts, if any exists.

If any of the selected terms of interest produces a conflict, conflict advice from Interpretation module 157 (FIG. 12) identifies other terms, parameters, attributes, and/or enumerations in dropdown menus 165, 166, and 167 (FIG. 13) for the selected results attribute, such as the "material" attribute shown in pane 160b (FIG. 13). Conflict advice may be presented to the user in any manner known in the art. As shown in FIG. 13, checkmark icon 161 or 162 next to an attribute name signifies a "correctable" conflict and that other enumerations are available to render the overall rule compliant.

Attributes identified in this manner will have one or more selectable enumerations with a positive notation "+" that may be selected.

If an attribute name of dropdown menus 165-167 has an "X" icon instead of a checkmark next to a name attribute, then it is totally invalid and no choice of enumerations for that attribute will resolve the conflict. In many applications, however, no distinction may be drawn between simple, correctable conflict advice and total conflict advice, and the end user is simply notified that a conflict exists for the given attribute.

To invoke elective events along with rule processing, such as a display of a message or the performance of a calculation, the execution engine uses the elective zdd described in connection with FIG. 11 to determine which, if any, elective events should occur. This is accomplished by taking the terms that result from a call to Elective Advice function 156 (FIG. 12) and adding that term to the results of the Advice function 150. Then, a call to an ElectiveSelect function with these terms is made, whereupon the result will contain the elective events that apply to the results obtained. On a call to an ElectiveSelect routine, prime groups, elective groups, and the validity group are included. This assures that elective groups are "don't cares" relative to the SelectE function.

Execution Example

The illustrated example of FIG. 13 assumes pressure set to high, thickness set to 0-25 mm, and pH is pending (no current user selection). Material is provided as a result, i.e., an output rather than an end-user input. Using the following Group-Index Table, index numbers corresponding to end-user selections are 5 from group 1 and 8 from group 3.

| Group-Index Table | | | |
|---|---|---|---|
| Group | | Index | |
| Number | Name | Number | Name |
| 0 | Material | 0 | Rubber |
| | | 1 | Silicone |
| | | 2 | Neoprine |
| 1 | Pressure | 3 | Low |
| | | 4 | Medium |
| | | 5 | High |
| 2 | pH | 6 | Acidic |
| | | 7 | Basic |
| 3 | Thickness | 8 | 0-25 mm |
| | | 9 | 25-50 mm |
| | | 10 | 50-75 mm |

Exemplary Step by Step Execution Method
Include Advice:
For each selection group
    AttrRels is used to find the related attributes
    Build the include MSTFG
    Call Select with the include zdd and MSTFG
    Add advice for this group only.
Include advice returns: 0, 1, 2, 3, 4, 6, 7, 9, 10
Exclude Advice:
Build the Exclude MSTFG
Exclude advice returns: 2, 5
NOR'ing with include advice removes 2 from the include advice.
Interpreting Prime Advice:
The resulting terms with "+" signs are: 0, 1, 3, 4, 6, 7, 9, 10.
Group 0 has {0, 1}, Group 1 has {3, 4}, Group 2 has {6, 7}, Group 3 has {9, 10}. There is a conflict between groups 1 and 3 because the selected terms are invalid. This conflict is resolvable by choosing a plus index from either group. Overall validity is FALSE because the selection terms are not included in the result terms.

Elective Advice:
Build the MSTFG using the terms from the prime advice and the validity term.
Perform the ElectiveSelect routine to find the elective terms.

Figure 14:
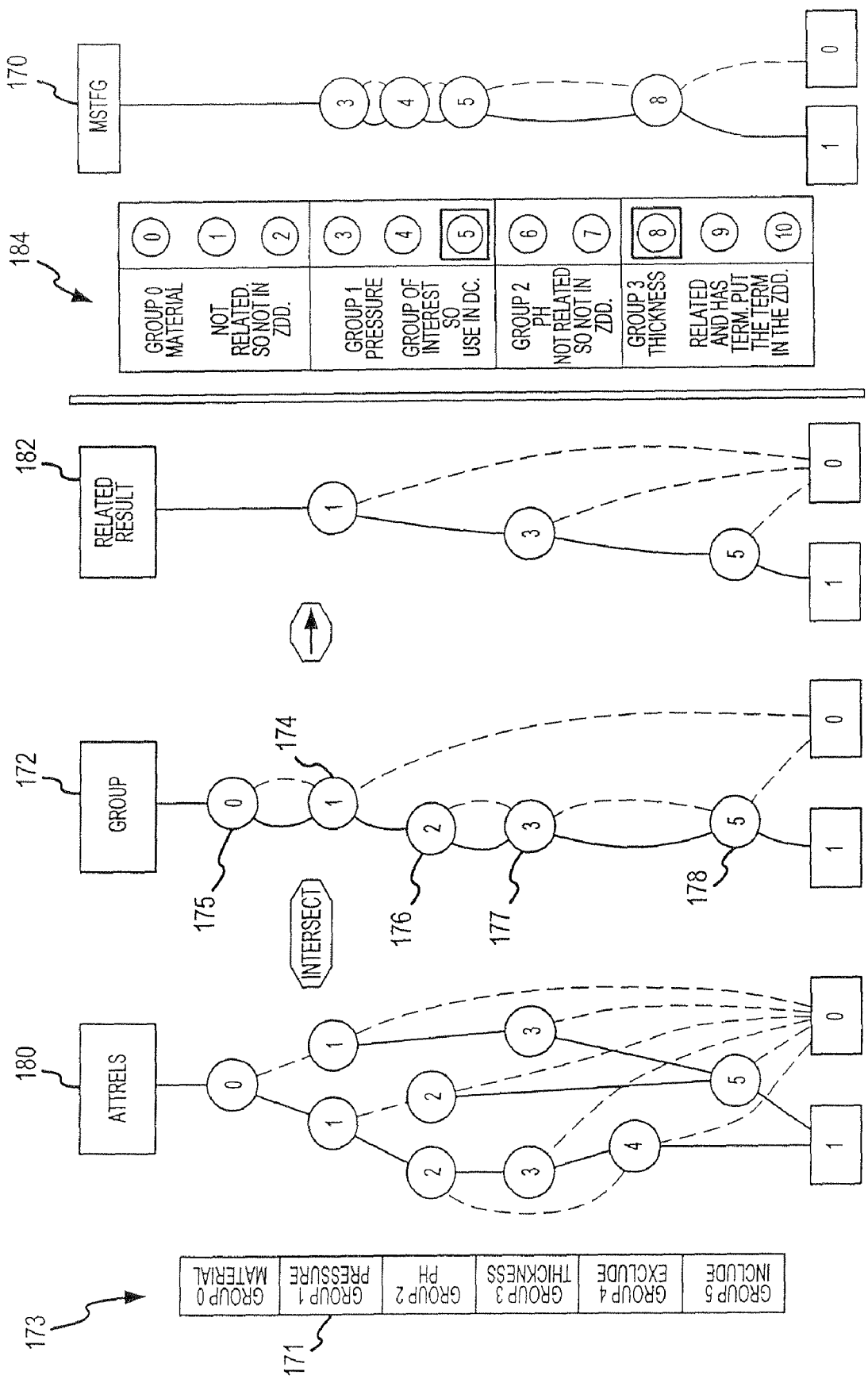
FIG. 14 illustrates building a MSTFG Zdd that is used during execution to produce conflict and/or selection advice in accordance with an aspect of the present invention.
Figure 15:
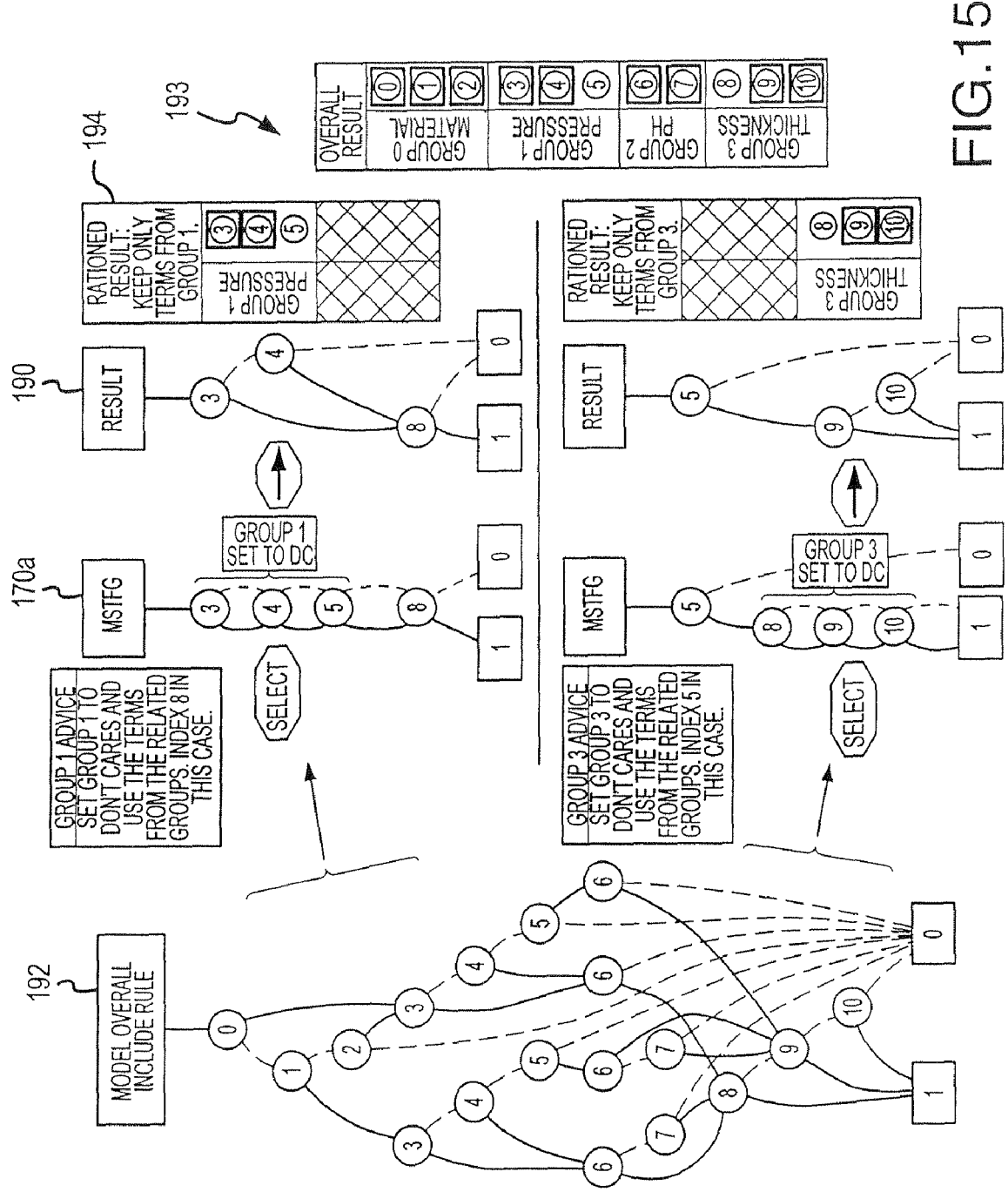
FIG. 15 illustrates a procedure for producing "include" advice during execution according to one aspect of the present invention.
Figure 16:
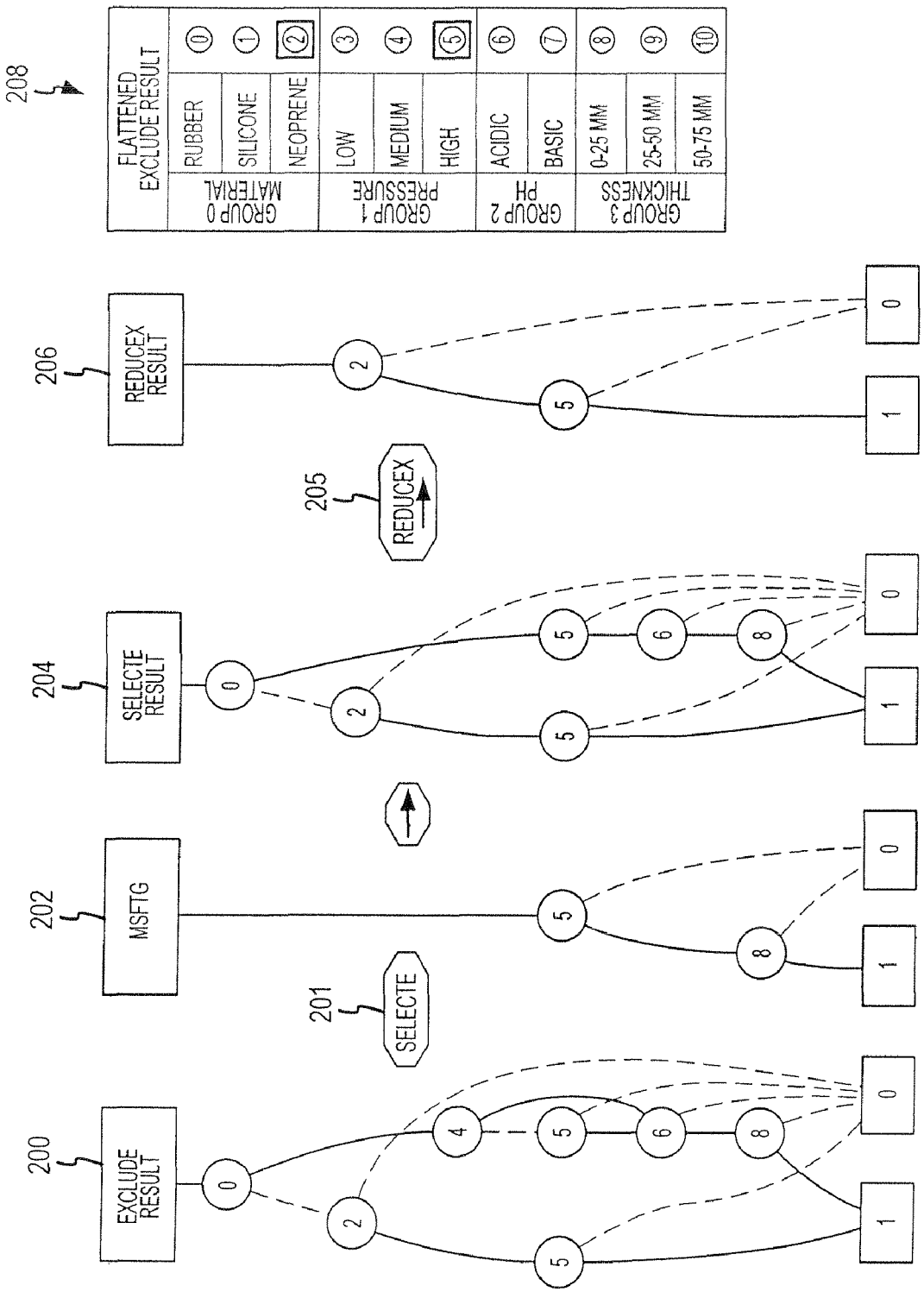
FIG. 16 illustrates a procedure for producing "exclude" advice during execution according to one aspect of the present invention.
Figure 18:
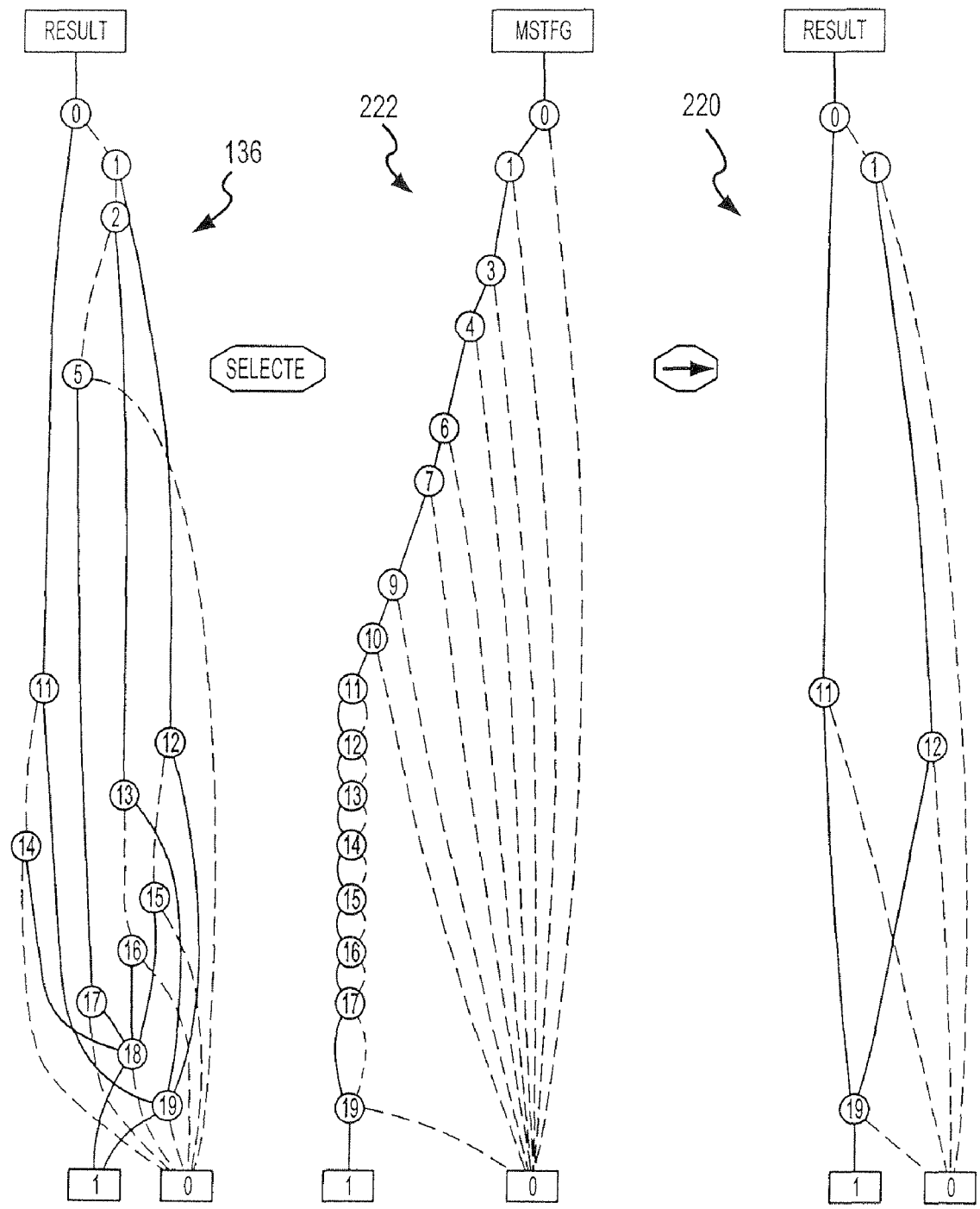
FIG. 18 illustrates a procedure for producing an Elective Events Results Zdd, which is preferably used during execution to invoke a display of a particular message or the performance of a given calculation in response to a condition or result developed by end-user inputs.

FIGS. 14, 15, 16, 17, 18 and 19 illustrate an exemplary execution process performed by the execution system. FIG. 14 illustrates building an exemplary include MSTFG. FIG. 15 shows use of that MSTFG to illustrate the include execution. FIG. 16 illustrates a typical exclude execution process. FIG. 17 shows the NOR operation. FIG. 18 illustrates elective execution. FIG. 19 shows how the results are interpreted. FIG. 20 illustrates one of many formats that may be used to store Zdd information in a memory storage device.

Building an MSTFG Zdd

FIG. 14 illustrates building the Make Selection Term For Group (MSTFG) zdd for a first group during execution of the Include Advice module 152 (FIG. 12). Illustrated is building an MSTFG 170 for group 1 (pressure), i.e., finding all groups 173 related to the group of interest 171 (group 1). The execution system proceeds by synthesizing a zdd 172 having a node 174 representing the group of interest 171 and nodes 175, 176, and 177 representing "don't cares" for all other include groups. A node 178 representing index "5" is added to notate an "include" relationship. Next, the execution system effects an intersecting of synthesized group 172 with the AttrRels zdd 180 (previously generated as AttrRels zdd 100 (FIG. 10) during the packaging process) to produce Related Results zdd 182. The Related Results zdd 182 is then flattened to produce indices {1,3,5}, which indicate that group 1 is related to group 3. Index {5} denotes that the relationship is an "include" relationship. Using the Related Results zdd 182 and MakeSelectionTermForGroup routine set forth in the Appendix, the execution system generates MSTFG zdd 170. Relational diagram 184 describes the relevancy of nodes relative to determining the MSTFG zdd.

FIG. 15 illustrates a Select operation performed by module 152 (FIG. 12). To produce advice via result zdds 190a and 190b, a preferred method comprises collecting include advice for each group and a Select routine described in the Appendix uses the overall rule model zdd 192 and the MSTFG zdds 170a and 170b generated during the MSTFG building process (FIG. 14). During the Select operation, nodes in the MSTFG zdds 170a and 170b are set to "don't care", but terms for other groups remain in the respective zdds 170a and 170b. This operation is performed for each group with selections, e.g., groups 1 and 3 (see, for example, identified groups in zdd 182 (FIG. 14)). The Select routine produces advice via Result zdds 190a and 190b. A similar procedure is performed for other related include groups, i.e., group "zero" and group 2. The Result zdds 190a and 190b are "flatten" at steps 194 and 195, respectively, by keeping those terms related to the associated group. The Result zdds 190a and 190b are then combined to produce an overall advice result 193, which includes indices {0, 1, 2, 3, 4, 6, 7, 9, 10} that are preferably stored in module 148 (FIG. 12). This process is repeated for the Exclude zdds, which generates exclude advice for storage in module 149 whereupon the advice results of both operations are NOR'ed at step 151 (FIG. 12). According to the AttrRels zdd, groups "zero" and two are not related to any groups with selections, so the advice settings for those groups remain at the default state of "on."

FIG. 16 illustrates operations carried out by module 154 (FIG. 12) relative to exclude rule advice to be generated and stored in module 149. Unlike obtaining the include advice, module 154 generates exclude in a single pass. An Exclude Result is simply generated by adding all user-selected input terms to form an Exclude Result zdd 200. Thereafter, module 154 calls a SelectE routine 201, which is set forth in the Appendix, against the Exclude Result zdd 200 to find paths that contain terms specified in the MSTFG zdd 202. Then, module 154 calls the ReduceX function 205, which is also set forth in the Appendix, to operate on the SelectE Result zdd 204 in order to find paths that are possibly one click ahead, e.g., ReduceX Result 206. From the Exclude Result zdd, it is seen that the combination {0, 5, 6, 8} is excluded. When the end user chooses only indexes {5, 8}, there is no way to choose both {0, 6} on the next click, so the advice associated therewith is invalid. As soon as the end user selects {0} or {6}, advice may be provided. The final result indicated in the ReduceX Result zdd 206 is {2} and {5}. Chart 208 shows flatten results {2, 5}.

FIG. 17 shows the results obtained by NOR'ing the include and exclude advice zdds obtained during the procedures described relative to FIGS. 15 and 16. The NOR'ing operation generates selection and conflict advice for the overall rule model. Module 151 performs the NOR'ing operation to eliminate from the include advice zdd those indexes that are also present in the exclude advice zdd. This yields the nodes of the Overall Result column 214 of FIG. 17. Include advice is shown in chart 193 (FIG. 15), which reflects the nodes of column 210 of the include advice zdd while exclude advice is shown in chart 208 (FIG. 16), which reflects the nodes of column 212 of the exclude advice zdd. Index {2} for Neoprene is "on" for the include advice and is also "on" for the exclude advice. Therefore, it is "off" for the overall result in column 214 as a result of the NOR'ing operation.

FIG. 18 illustrates operations performed by module 156 (FIG. 12) to build the elective events zdd. The elective events zdd controls which messages are communicated to the end user and which calculations are performed to produce a result that is also communicated to the end user. Messages and calculations are triggered by the advice zdds generated during execution. In the example discussed throughout the disclosure, the result from the prime advice is {0, 1, 3, 4, 6, 7, 9, 10} and the condition of the overall rule model is invalid. MSTFG zdd is produced from the prime advice where validity is set to invalid e.g., node 19 (FIG. 11) is selected. In addition, the message indexes {11, 12, 13} are set to "don't care" and the calculation indexes are also set to "don't care." This produces the MSTFG zdd 222 shown in FIG. 18. To produce the Result zdd 220, module 156 calls the SelectE routine 201 to apply the Result zdd 136 against MSTFG zdd 222. The Elective Result zdd 220 is then stored in module 158 (FIG. 12) for subsequent access by the Advice interpretation module 157. Result zdd 136 was previously generated during the Elective Events zdd construction, as discussed in connection with FIG. 11.

Chart 230 of FIG. 19 describes how to interpret the advice results, e.g., how module 157 (FIG. 12) interprets the results of the prime advice 214 (FIG. 17) as well as the Elective Results advice zdd 220 (FIG. 18) in view of user inputs. A first step preferably comprises confirming that user selections in column 232 of FIG. 19 entered at step 140 (FIG. 12) are present in prime advice column 234. Since none of the user inputs {5, 8} appear in the prime advice column 234, the validity status in column 236 for group "1" and group "3" is set to "invalid." The status of group "zero" and group "2" remains valid. A second step preferably comprises confirming that prime groups have at least one index marked "on" in prime advice column 234. Since all groups in the specified example illustrated in chart 230 satisfy this condition, no action is taken and no additional group in the group validity column 236 is marked "invalid." A third step preferably includes determining overall validity, which is based on the validity status of all groups in the illustrated example. Overall validity is attained when all groups of column 236 are "valid." In this case, group "zero" and group "2" are valid and group "1" and group "3" are invalid. Therefore, overall validity of the rule model is "invalid." A fourth step preferably comprises determining conflict advice for the groups. If a group is "invalid" and has other, "valid" choices, then it will have conflict advice. The presence of available conflict advice is noted by a "yes" or "no" in column 238. For the example shown in FIG. 19, group "1" and group "3" are marked "yes" in conflict advice column 238 since other valid choices exists in the respective groups. For example, group "1" is invalid but changing the user input to "low" pressure or "medium" pressure will render the group valid. A fifth step preferably includes placing selection advice notations, e.g., a "+" sign or a "−" sign, on labels for each group item, e.g., enumerations in column 242. The applied label is a direct function of the asserted, i.e., boxed, nodes in the prime advice column 234. The enumerations or parameters associated with asserted nodes {0, 1, 3, 4, 6, 7, 9, 10} bear a "+" sign label, which enumerations or parameters associated with non-asserted nodes {2, 5, 8} bear a "−" sign label. The sixth and final step preferably includes interpreting the elective advice where an elective term that is "on" in the elective events column 240 is executed, In the illustrated example, messages MessR for rubber and MessS for silicone are executed, e.g., displayed. No calculations are performed.

Interpreting elective advice and triggering elective events are now described. As previously indicated, elective events control the display of messages and the execution of calculations. In some cases it may be sufficient to merely select or deselect a particular message/calculation for display/execution. In the general case, it is preferable to allow elective events to control selection from several alternative texts of a message or from several alternative expressions of a calculation. The simple select/deselect case is but a special scenario of the more general selection-among-alternates case. The maintenance or rule entry tool supports a general, selection-among-alternates case by allowing multiple text messages to be maintained for each message and multiple expressions to be maintained for each calculation.

Since there are multiple alternate texts/expressions for messages/calculations, situations may arise where elective advice calls for several of the alternatives to be displayed/executed simultaneously. Since only one of the alternatives can be displayed/executed at any one time, elective priority is established between the alternatives. The alternative text/expression with the lowest priority value is displayed/executed. Priority values may be associated with the respective messages and/or calculation and entered during rule entry to achieve this purpose.

Optional Embodiments

In the simple case, an expression of a calculation is selected for execution through elective advice, the expression is executed, and the result returned and communicated to the user when appropriate. In the more general case, it may be preferable to allow the result of one calculation to be used in the computation of another calculation, and the subsequent result used as well, and so on, recursively. This creates dependencies between calculations which, in turn, force execution of calculations in a particular sequence so as to obtain the proper or intended result. A proper execution sequence is easily obtained by arranging the various references in a dependency tree and performing a depth-first ordering or topological sort within the dependency tree. Calculation sequencing may be performed during the packaging step to achieve this purpose. Further, circularity of reference can be easily detected through this same ordering mechanism. Since computation of a set of circularly referenced calculations cannot be accomplished, the model maintenance tool checks for circularity as each reference is entered. Depth-first ordering or topological sort algorithms are well described in several standard software engineering texts (see "Fundamentals of Data Structures" by E. Horowitz & S. Sahni, Computer Science Press, Inc. ISBN 0-914894-20'X Copyright 1976 pp 310-315).

Making selections is easily achieved. The illustrated example shows selections for pH, pressure, and thickness being set using a conventional drop-down list (FIG. 13) manipulated by an end user. Selection may also be accomplished with other GUI controls such as radio-buttons, menu selections, etc., or from another program using no interface at all.

In addition, for some inputs, particularly inputs of numeric values, a user may desire to enter a specific numeric or alphabetic value rather than select a choice from a list of parameters or enumerations. In the case of thickness for example, the user may wish to enter the value "22." This scalar input value can be used to determine the correct selection of a segmented range by comparing the scalar value with minimum and maximum values for each of the thickness selections embedded among the pre-defined thickness enumerations. In the case of an entry "22," the input module 140 (FIG. 12) automatically selects 0-25 mm thickness on behalf of the user. Maximum and minimum ranging values are maintained by the model maintenance tool to achieve this purpose.

For some inputs, the user may wish to enter a set of values and execute a calculation to determine the desired selection. For instance, a user may wish to enter the circumference and width of an oval cross section and have a calculation determine the corresponding thickness. Input module 140 (FIG. 12) may automatically determine the resultant value and select the appropriate selection through ranging as previously described. Special input calculations are maintained by the rule entry tool to achieve this purpose. These special input calculations are maintained independent of the output calculations described elsewhere and are not coupled to elective processing.

The exemplary rule and processes therefore described herein provide a basis for extending application of the invention to the provisions of business and engineering products and services, generally. Automation of large-scale and/or small-scale systems may take advantage of the rule processing techniques of the invention, Use of terms such as attributes, enumerations, parameters, etc. to describe a rule is not made in the restrictive sense but is intended to include a broad range of properties or characteristics associated with a rule. Even though directed acylic graphs such as binary decision diagrams are preferred for rule representation, they are in no way limiting to the type of rule representation or manipulation embraced by the invention. For example, a method or system that emulates relations between attributes and enumerations, and relations between attributes, to provide an indication of satisfiability or advice to achieve satisfiability according to the teachings herein falls within the scope of the present invention. Accordingly, the invention includes such software emulations and systems predicated on the teachings herein. Also, an overall or prime rule to be automated may be predicated only on one type of rule component or sub-part, and need not be segmented or processed as an include rule or rule component, or an exclude rule or rule components.

APPENDIX

Execution Engine Pseudocodes
   Routines referenced, but not pseudocoded:
      AddPrimeOptionsToTerms (Groups, Terms, AdviceTerms)
         Add the options from AdviceTerms to Groups and Terms.
      GetUniqueIndexesFromTree
         A routine that will traverse a Zdd and return the set of unique indexes found in the Zdd.
      MKz (index, low, high)
         The zdd analog to the ROBDD MK function. It will find (or create) a new node in the zdd, which has a matching index, low leg and high leg. This routine enforces the zero suppression required by Zdd's.
   MakeSelectionTermForGroup pseudocode:

---

```
Description: This routine builds a zdd that will be used in subsequent
   select operations. It uses the set of terms, groups, related groups
   and the flags to build the tree for different situations. For example,
   when selecting terms from the elective zdd, don't cares are not used.
   This routine also takes into account when
Given:
   Groups = The set of groups for this tree.
   Terms = The set of terms for this tree.
   GroupOfInterest = The group to be excluded on this tree.
   UseDontCares = True if Don't cares should be added.
   RelatedGroups = Set of groups related to current group.
Produces:
   Result = The new selection term tree that will be used by
      Select (or SelectElective)
Function MakeSelectionTermForGroup(Groups, Terms, GroupOfInterest,
      UseDontCares, RelatedGroups)
Result = 1;
// TODO: Major work needed in here ...
For each var in Zdd from last to first
   group = GetGroupOfVar(var)
   If group <> GroupOfInterest then
      If group is in Groups then
         If group is in RelatedGroups then
            If group has a term then
               If GroupOfInterest is not specified then
                  MSTFG = MKz(var, MSTFG, zero) // Elective only
               Else
                  MSTFG = MKz(var, MSTFG, MSTFG)
               End If
            Else If groupType = 1 then
               MSTFG = MKz(var, MSTFG, MSTFG) // Message group
            End If
         Else
            MSTFG = MKz(var, MSTFG, MSTFG)
         End If
      Else
         If UseDontCares then MSTFG = MKz(var, MSTFG, MSTFG)
      End If
   Else
      If UseDontCares then MSTFG = MKz(var, MSTFG, MSTFG)
   End If
Next
Return MSTFG
End Function MakeSelectionTermForGroup
```

Advice, an algorithm which returns the conflict advice and options given a prime Zdd and its selection term:

```
Given:
    Prime = The prime zdd.
    Groups = The set of groups to be considered.
    Terms = The set of terms to be considered.
Produces:
    Result = The resulting set of terms.
Function Advice(Prime, Groups, Terms)
    FoundInclude = SelectionInclude(PrimeInclude, AttrRels, Terms, Groups)
    FoundExclude = SelectionInclude(PrimeExclude, Terms, Groups)
    Result = FoundInclude NOR FoundExclude
    Return Result
End Function Advice
```

SelectionInclude routine:

```
Given:
    PrimeInclude = The prime include zdd.
    Groups = The set of groups to be considered.
    Terms = The set of terms to be considered.
    AttrRels = The attributes relations zdd.
Produces:
    Result = Set of terms from the Include Zdd that match this selection.
Function SelectionInclude(PrimeInclude, AttrRels, Terms, Groups)
    For each Group in Groups
        Term = GetTermForGroup(Terms, Group)
        RelatedGroups = SelectionRelated(AttrRels, Term, Group)
        SelectTerm = MakeSelectionTermForGroup(Groups, Terms, -1, true, RelatedGroups)
        IncludeAdvice = Select(PrimeInclude, SelectTerm)
        Result = Result + GetAdviceForGroup(Group)
    Next Term
    Return Result
End Function
```

SelectionRelated routine:

```
Given:
    AttrRels = The attribute relationships zdd.
    Group = The set of groups to be considered.
Produces:
    Result = Set of terms from the Exclude Zdd that match this selection.
Function SelectionInclude(AttrRels, Group)
    RelTerms = MakeSelectionTermForGroup(AllGroups, Group, -1, true, RelatedGroups)
    Result = Intersect(AttrRels, RelTerms)
    Return Result
End Function
```

SelectionExclude routine:

```
Given:
    PrimeExclude = The prime include zdd.
    Groups = The set of groups to be considered.
    Terms = The set of terms to be considered.
Produces:
    Result = Set of terms from the Exclude Zdd that match this selection.
Function SelectionExclude(PrimeExclude, Terms, Groups)
    SelectTerms = MakeSelectionTermForGroup(Groups, Terms, -1, true, RelatedGroups)
    ExcludeAdvice = SelectE(PrimeExclude, SelectTerm)
    Result = ReduceX(ExcludeAdvice, SelectTerms)
    Return Result
End Function
```

ElectiveSelect routine:

```
Given:
    Elective = The elective zdd.
    Groups = The set of groups to be considered.
    Terms = The set of terms to be considered.
    AdviceTerms = Terms from prime advice (optional)
Produces:
    Result = Set of terms that match this selection.
Function ElectiveSelect(Elective, Groups, Terms, AdviceTerms)
    AddPrimeOptionsToTerms(Groups, Terms, AdviceTerms)
    SelectTerm = MakeSelectionTermForGroup(Groups, Terms, -1, false)
    RT = SelectE(Elective, SelectTerm)
    //Add all unique indexes in r to the result list.
    Result = GetUniqueIndexesFromTree(RT, -1)
    Return Result
End Function ElectiveSelect
```

Select, an algorithm for selecting the set of minterms from a zdd Prime that meets the conditions of the zdd TermTree.

```
Given:
    Prime = Prime Zdd.
    TermTree = Term to select against.
Function Select(Prime,TermTree)
    if TermTree = 1 then return Prime
    if TermTree = 0 then return 0
    if Prime = 0 or Prime = 1 then return Prime
    if var(TermTree) < var(Prime) then
        if high(TermTree) = low(TermTree)
            return Select(Prime, high(TermTree))
        else
            return 0
    else if var(TermTree) = var(Prime)
        return MKz(var(Prime), Select(low(Prime), low(TermTree)),
            Select(high(Prime), high(TermTree)))
    else if var(Prime) < var(TermTree)
        return Select(low(Prime), TermTree)
End Function Select
```

SelectE, an algorithm for selecting the set of minterms from the elective zdd Elective that meets the conditions of the zdd TermTree.

```
Given:
    Elective = Elective Zdd.
    TermTree = Term Zdd to select against.
Function SelectE(Elective, TermTree)
    if TermTree = 1 then return Elective
    if TermTree = 0 then return 0
    if Elective = 0 or Elective = 1 then return Elective
    if var(TermTree) < var(Elective) then
        if high(TermTree) = 1
            return 0
        else
            return SelectE(Elective, high(TermTree))
    else if var(TermTree) = var(Elective)
        return MKz(var(Elective), SelectE(low(Elective), TermTree),
            SelectE(high(Elective), high(TermTree)))
    else if var(Elective) < var(TermTree)
        return SelectE(low(Elective), TermTree)
End Function SelectE
```

What is claimed is:

1. A system comprising:
means for storing a digital representation of a zero-suppressed binary decision diagram (ZDD) formed by manipulatively combining:

an Include ZDD rule component that indicates inclusive constraints of a rule model;

an Exclude ZDD rule component that indicates exclusive constraints of the rule model; and an Attribute Relations ZDD constructed from the Include and Exclude rule components to indicate interrelations between the Include and Exclude ZDD rule components; and means for determining a result responsive to an application of inputs to the ZDD, the inputs characterizing desired constraints of the rule model.

2. The system of claim 1 where the inclusive constraints comprise included or true relations between an attribute and an enumeration value of the rule model; and where the exclusive constraints comprise excluded or false relations between an attribute and an enumeration value of the rule model.

3. The system of claim 2 where the ZDD is formed by manipulatively combining an Elective Events ZDD component with the rule model to invoke a data processing event responsive to a predetermined combination of constraints of the rule model.

4. The system of claim 3 where the data processing event includes communicating a message.

5. The system of claim 3 where the data processing event includes performing a calculation.

6. The system of claim 2 where the Include and Exclude ZDD rule components have associated attributes and enumeration values.

7. The system of claim 6 where the associated attributes and enumeration values have an assigned indexed order;

where the ZDD includes ordered indices of attributes and enumeration values; and where the means for storing is configured to store the ZDD in a reduced canonical form according to ordered indices.

8. The system of claim 7 where the ZDD has an initial size defined by a number of nodes, which nodes are subsequently reordered to reduce the size of the ZDD.

9. The system of claim 8 where the number of nodes of the Include and Exclude ZDD components of the ZDD are separately reduced prior to manipulatively combining.

10. A tangible computer readable medium having instructions stored thereon, the instructions comprising:

instructions to provide a cross-reference table of attributes and enumeration values indicative of rule components of the rule;

instructions to define components of the rule by selecting an inclusive or exclusive relation between the attributes and enumeration values in respective rows and columns of the table;

instructions to form an Include ZDD rule component from the inclusive relations;

instructions to form an Exclude ZDD rule component from exclusive relations;

instructions to produce an Attribute Relations ZDD rule component based on the Include and Exclude rule components;

instructions to construct the ZDD rule model based on the Include, Exclude, and Attribute Relations rule components; and instructions to store the ZDD rule model in a memory.

11. The tangible computer readable medium of claim 10 further comprising:

instructions to assign an order to elements of the Include and Exclude rule components to established ordered indices; and instructions to store the rule model in reduced canonical form according to the ordered indices.

12. The tangible computer readable medium of claim 11 where the table comprises a cross-reference matrix of attributes and related enumeration values.

13. The tangible computer readable medium of claim 11 further comprising:

instructions to define elective events according to a predetermined combination of attribute and enumeration values, which events are operative to invoke data processing to effect display of a message or performance of a calculation.

14. The tangible computer readable medium of claim 10 where the Include and Exclude rule components each have a number of nodes in their respective ZDD representations indicative of complexity; and further comprising instructions to reorder the nodes to reduce the complexity of the ZDD representations.

15. The tangible computer readable medium of claim 14 further comprising instructions to reorder the nodes prior to manipulatively combining the components to construct the ZDD rule model.

* * * * *

UNITED STATES PATENT AND TRADEMARK OFFICE
CERTIFICATE OF CORRECTION

PATENT NO. : 7,809,669 B2
APPLICATION NO. : 12/170369
DATED : October 5, 2010
INVENTOR(S) : Huelsman et al.

It is certified that error appears in the above-identified patent and that said Letters Patent is hereby corrected as shown below:

Title page, item (56), under "Other Publications", in Column 2, Line 1, delete "CUDD:CU" and insert -- CUDD: CU --.

Title page, item (57), under "Abstract", in Column 2, Line 6, delete " and/or (iii)" and insert -- and/or --.

Page 2, item (56), under "Other Publications", in Column 2, Line 5, delete "State;University." and insert -- State University; --.

Page 2, item (56), under "Other Publications", in Column 2, Line 12, delete "Internet presented at",The" and insert -- Internet", presented at the --.

Page 2, item (56), under "Other Publications", in Column 2, Line 19, delete "Auxilary" and insert -- Auxiliary --.

Page 2, item (56), under "Other Publications", in Column 2, Line 30, delete "Funtions," and insert -- Functions, --.

Page 2, item (56), under "Other Publications", in Column 2, Line 31, delete "Fujia, ed.s," and insert -- Fujita, eds., --.

Page 2, item (56), under "Other Publications", in Column 2, Line 42, delete "Characterization,Thesis," and insert -- Characterization, Thesis, --.

Page 2, item (56), under "Other Publications", in Column 2, Line 42, delete "U.,May" and insert -- U., May --.

Page 2, item (56), under "Other Publications", in Column 2, Line 63, delete "Patentablility;" and insert -- Patentability; --.

Signed and Sealed this
Twentieth Day of March, 2012

David J. Kappos
*Director of the United States Patent and Trademark Office*

CERTIFICATE OF CORRECTION (continued)
U.S. Pat. No. 7,809,669 B2

Page 2, item (56), under "Other Publications", in Column 2, Line 65, delete "Patentablility;" and insert -- Patentability; --.

Page 3, item (56), under "Other Publications", in Column 1, Line 5, delete "101,154" and insert -- 10/101,154 --.

Page 3, item (56), under "Other Publications", in Column 2, Line 5, delete "2.;" and insert -- 2; --.

Page 3, item (56), under "Other Publications", in Column 2, Line 7, delete "field" and insert -- filed --.